(12) United States Patent

French et al.

(10) Patent No.: US 12,635,615 B2

(45) Date of Patent: May 26, 2026

(54) SHELVING SYSTEM FOR PLANT CULTIVATION

(71) Applicant: Pipp Mobile Storage Systems, Inc., Walker, MI (US)

(72) Inventors: Thomas A. French, Grand Haven, MI (US); Delos A. Rockwell, Lowell, MI (US); David E. Kowalski, Grandville, MI (US)

(73) Assignee: Pipp Mobile Storage Systems, Inc., Walker, MI (US)

( * ) Notice: Subject to any disclaimer, the term of this patent is extended or adjusted under 35 U.S.C. 154(b) by 0 days.

(21) Appl. No.: 18/733,441

(22) Filed: Jun. 4, 2024

(65) Prior Publication Data

US 2024/0315178 A1 Sep. 26, 2024

Related U.S. Application Data

(63) Continuation of application No. 17/473,617, filed on Sep. 13, 2021, now Pat. No. 11,997,963, which is a continuation-in-part of application No. 16/186,975, filed on Nov. 12, 2018, now Pat. No. 11,116,148.

(60) Provisional application No. 62/633,588, filed on Feb. 21, 2018, provisional application No. 62/586,165, filed on Nov. 14, 2017.

(51) Int. Cl.
*A01G 9/14* (2006.01)
*A01G 9/24* (2006.01)

(52) U.S. Cl.
CPC .............. *A01G 9/143* (2013.01); *A01G 9/247* (2013.01)

(58) Field of Classification Search
CPC .......... A01K 9/14; A01K 9/143; A01K 9/147; A01K 9/1476; A01K 9/24; A01K 9/247
USPC ............................................................. 47/17
See application file for complete search history.

(56) References Cited

U.S. PATENT DOCUMENTS

| | | | | | |
|---|---|---|---|---|---|
| 2,475,388 | A | * | 7/1949 | Hart | A01G 25/09 |
| | | | | | 239/69 |
| 3,024,569 | A | * | 3/1962 | Nearing | A01G 9/1423 |
| | | | | | 47/18 |
| 3,772,827 | A | * | 11/1973 | Ware | A01G 9/022 |
| | | | | | D6/558 |
| 4,887,386 | A | * | 12/1989 | Minshull | A01G 31/02 |
| | | | | | 47/79 |
| 5,101,593 | A | * | 4/1992 | Bhatt | A01G 9/243 |
| | | | | | 47/61 |
| 6,164,537 | A | * | 12/2000 | Mariani | G06K 17/0022 |
| | | | | | 235/383 |
| 2006/0162246 | A1 | * | 7/2006 | Okabe | A01G 9/246 |
| | | | | | 47/1.01 R |
| 2010/0096344 | A1 | * | 4/2010 | Vanderhoek | A47F 7/0078 |
| | | | | | 211/49.1 |

(Continued)

*Primary Examiner* — Brady W Frazier

(74) *Attorney, Agent, or Firm* — Gardner, Linn, Burkhart & Ondersma LLP

(57) ABSTRACT

Plant support equipment includes trays each have a plant-supporting surface and a series of grooves or channels extending below the pot-supporting surface. The plant support trays have water runoff troughs that receive runoff water from the grooves or channels. The plant support trays may be configured to provide gravity-based drainage while supported on a horizontal frame or rack or platform, or may be configured to provide drainage while supported on an angled frame or rack or platform.

20 Claims, 30 Drawing Sheets

(56)     References Cited

U.S. PATENT DOCUMENTS

| | | | | |
|---|---|---|---|---|
| 2012/0054061 A1* | 3/2012 | Fok | .................. | A01G 9/249 |
| | | | | 73/865.8 |
| 2012/0279127 A1* | 11/2012 | Yusibov | ............. | A01G 31/06 |
| | | | | 47/65.5 |
| 2013/0298463 A1* | 11/2013 | Ke | .................. | A01G 9/033 |
| | | | | 47/79 |
| 2014/0026480 A1* | 1/2014 | Lenhart, Jr. | .......... | A01G 9/247 |
| | | | | 47/65.9 |
| 2014/0137472 A1* | 5/2014 | Anderson | .......... | A01G 31/02 |
| | | | | 47/62 A |
| 2015/0351329 A1* | 12/2015 | Heidl | ............... | A01G 9/247 |
| | | | | 211/49.1 |
| 2021/0274724 A1* | 9/2021 | Gru | .................. | A01G 9/249 |

\* cited by examiner

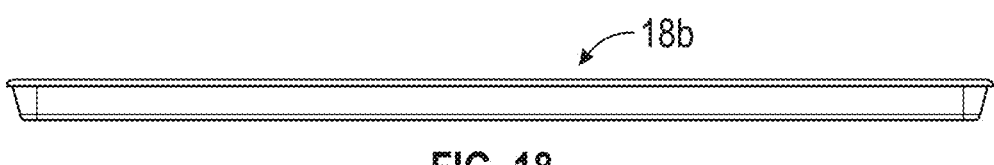
FIG. 18
18c
20c
22
36
FIG. 19
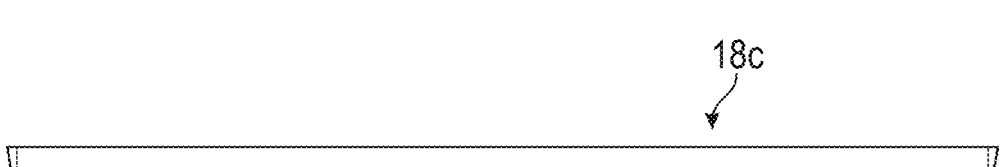
18c
FIG. 20

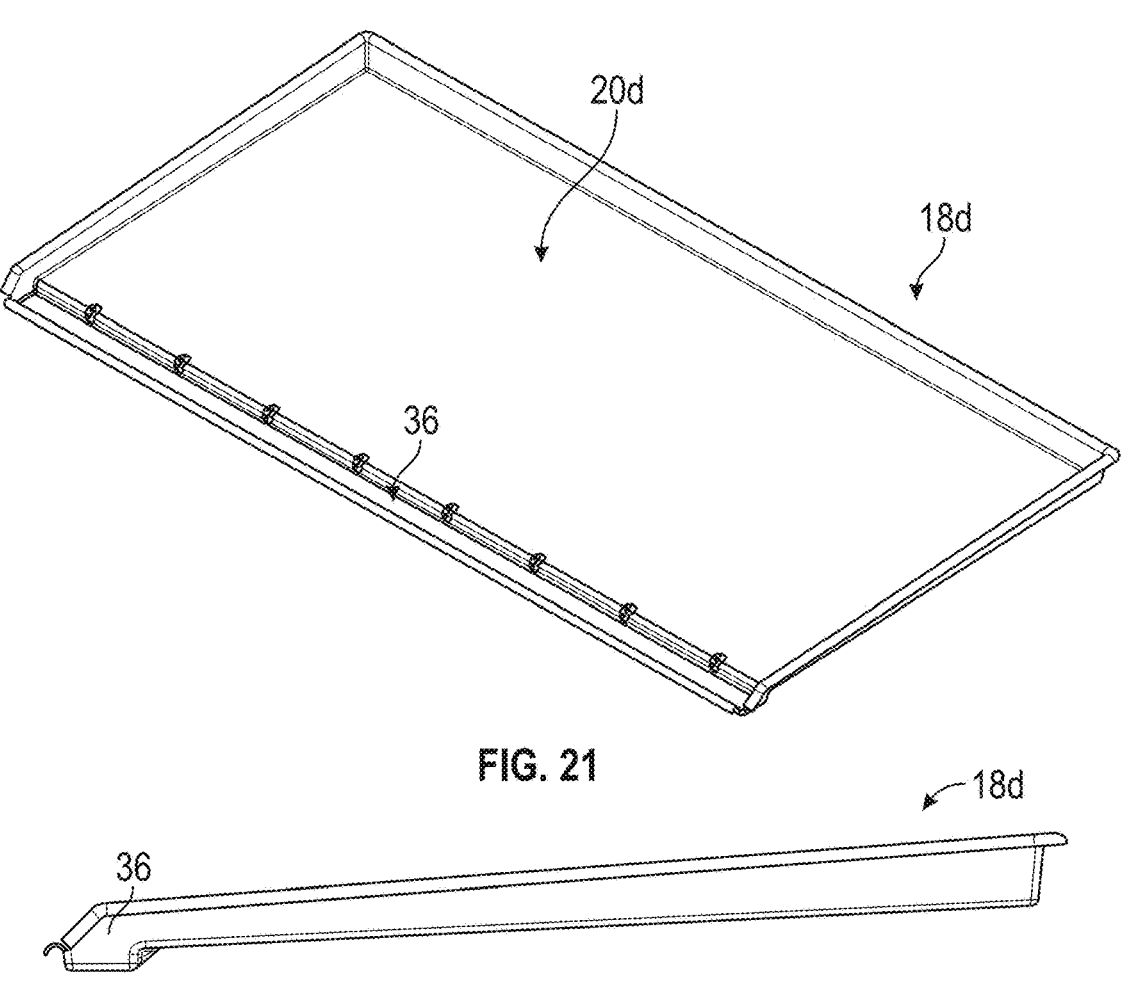
FIG. 21
FIG. 22
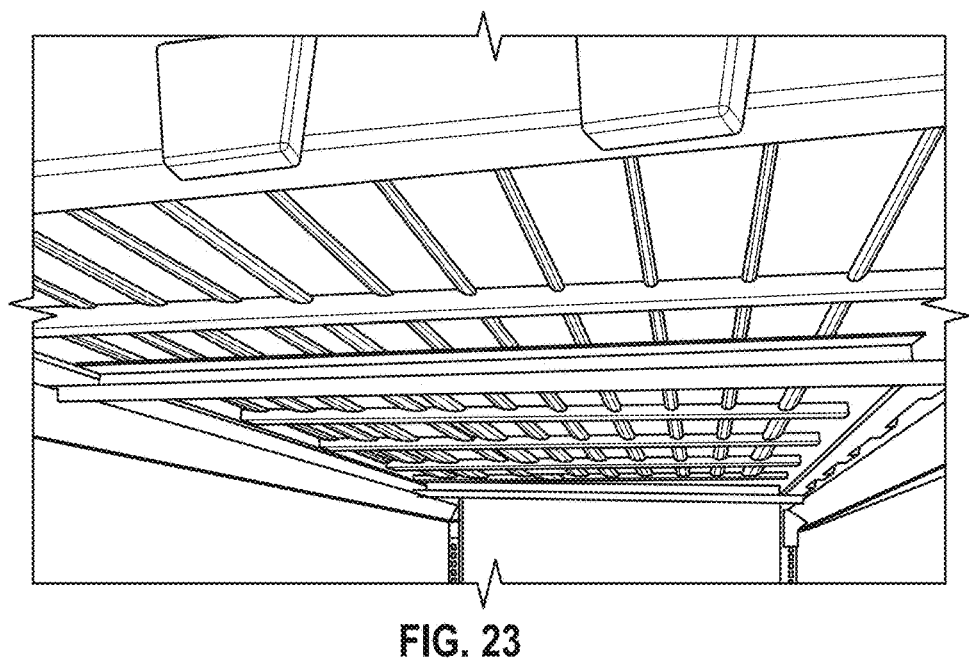
FIG. 23

SHELVING SYSTEM FOR PLANT CULTIVATION

CROSS REFERENCE TO RELATED APPLICATIONS

The present application is a continuation of U.S. patent application Ser. No. 17/473,617, filed Sep. 13, 2021, now U.S. Pat. No. 11,997,963, which is a continuation-in-part of U.S. patent application Ser. No. 16/186,975, filed Nov. 12, 2018, now U.S. Pat. No. 11,116,148, which claims the benefit of U.S. provisional application Ser. No. 62/633,588, filed Feb. 21, 2018, and U.S. provisional application Ser. No. 62/586,165, filed Nov. 14, 2017, all of which are hereby incorporated herein by reference in their entireties.

FIELD OF THE INVENTION

The present invention relates to plant cultivating systems and equipment, in particular for indoor or greenhouse farming.

BACKGROUND OF THE INVENTION

Efficiency and productivity for indoor growing rely on efficient space utilization and optimal lighting, watering, and air flow to meet a given plant type's needs while minimizing waste of electricity and water loss, and reducing the risks of mold and disease that can reduce production.

SUMMARY OF THE INVENTION

The present invention provides a shelving system and plant-support trays for efficient plant cultivation in indoor environments ranging from green houses to environmentally isolated buildings or other structures where all plant growth needs, from lighting to water and nutrients, are provided by caretakers. The system includes provisions for lighting, ventilation, watering and water drainage, for plants arranged in respective pots or containers and resting in or on drainage trays in vertically stacked arrangement.

In one form of the present invention, a shelving system for plant cultivation includes a frame with at least two upright frame portions, a drive mechanism coupled to the frame, at least two vertically-spaced support racks extending between the upright frame portions of the frame, a plant support tray at each support rack, a forced-air ventilation system, and a lighting system. The drive mechanism is operable to move the frame along a substantially horizontal support surface, such as a floor in a warehouse or greenhouse. Each plant support tray has a pot supporting surface and a plurality of grooves or channels extending below the pot supporting surface. The forced-air ventilation system includes a duct positioned below an upper one of the support racks, and the lighting system includes electric lamps supported below the upper support rack and below the duct.

In another form of the present invention, a plant support tray includes a perimeter wall, a planar plant support surface with a plurality of drainage channels extending downwardly therefrom, and a trough for collecting runoff fluids. The perimeter wall has an upper edge portion and a lower edge portion lying in a lower horizontal plane that is spaced below the upper edge portion. The planar plant support surface lies in an intermediate plane located between the perimeter wall's upper edge portion and the lower horizontal plane, and is positioned inwardly of the perimeter wall. The drainage channels extend below the intermediate plane, and are sloped downwardly from the rear end region of the plant support surface to a front end region of the plant support surface, toward the trough. The trough includes a bottom trough surface that is positioned below the drainage channels.

In another form of the present invention, a plant support system includes a plant support tray having a forward end portion received at a trough. The trough has a bottom panel defining an outlet, a rear lip, a forward lip that is taller than the rearward lip, and a pair of sidewalls. The rear lip extends up from the bottom panel and supports the forward end portion of the plant support tray. The forward lip extends upwardly from the bottom panel and is located forward of the forward end portion of the plant support tray. Optionally, a generally Z-shaped beam supports the trough.

Therefore, the plant shelving system and trays of the present invention provide for efficient space utilization and ease of use, including maintenance of the system and care of plants being grown on the system. The trays can support potted plants in a horizontal plane when on a horizontal rack, while providing sloped drainage channels to a runoff collection trough, and are readily cleanable, particularly when unitarily formed of a resinous plastic or stamped metal, for example. These and other objects, advantages, purposes and features of this invention will become apparent upon review of the following specification in conjunction with the drawings.

BRIEF DESCRIPTION OF THE DRAWINGS

FIG. 18 is an end elevation of the plant support tray of FIG. 17;

FIG. 19 is a top perspective view of a plant support tray in accordance with the present invention, having a grid pattern of drainage and airflow channels, a full-length trough, and no built-in runoff slope;

FIG. 20 is an end elevation of the plant support tray of FIG. 19;

FIG. 21 is a top perspective view of a plant support tray in accordance with the present invention, having a substantially continuous planar support surface, a full-length trough, and no built-in runoff slope;

FIG. 22 is an end elevation of the plant support tray of FIG. 21;

FIG. 23 is a bottom perspective view depicting support structure for a plant support tray;

DESCRIPTION OF THE PREFERRED EMBODIMENTS

Figure 1:
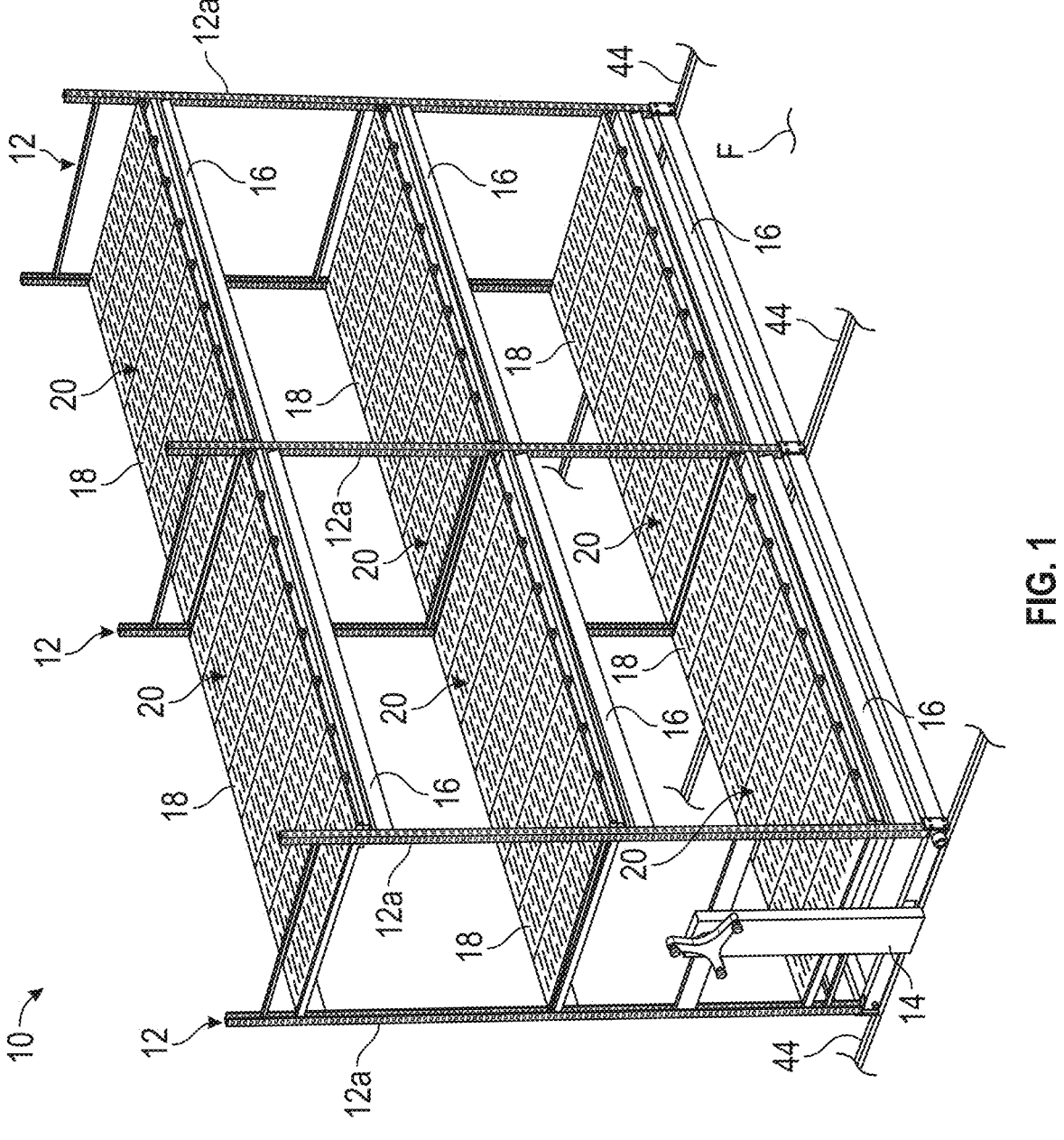
FIG. 1 is a perspective view of a shelf system for plant cultivation, in accordance with the present invention.
Figure 2:
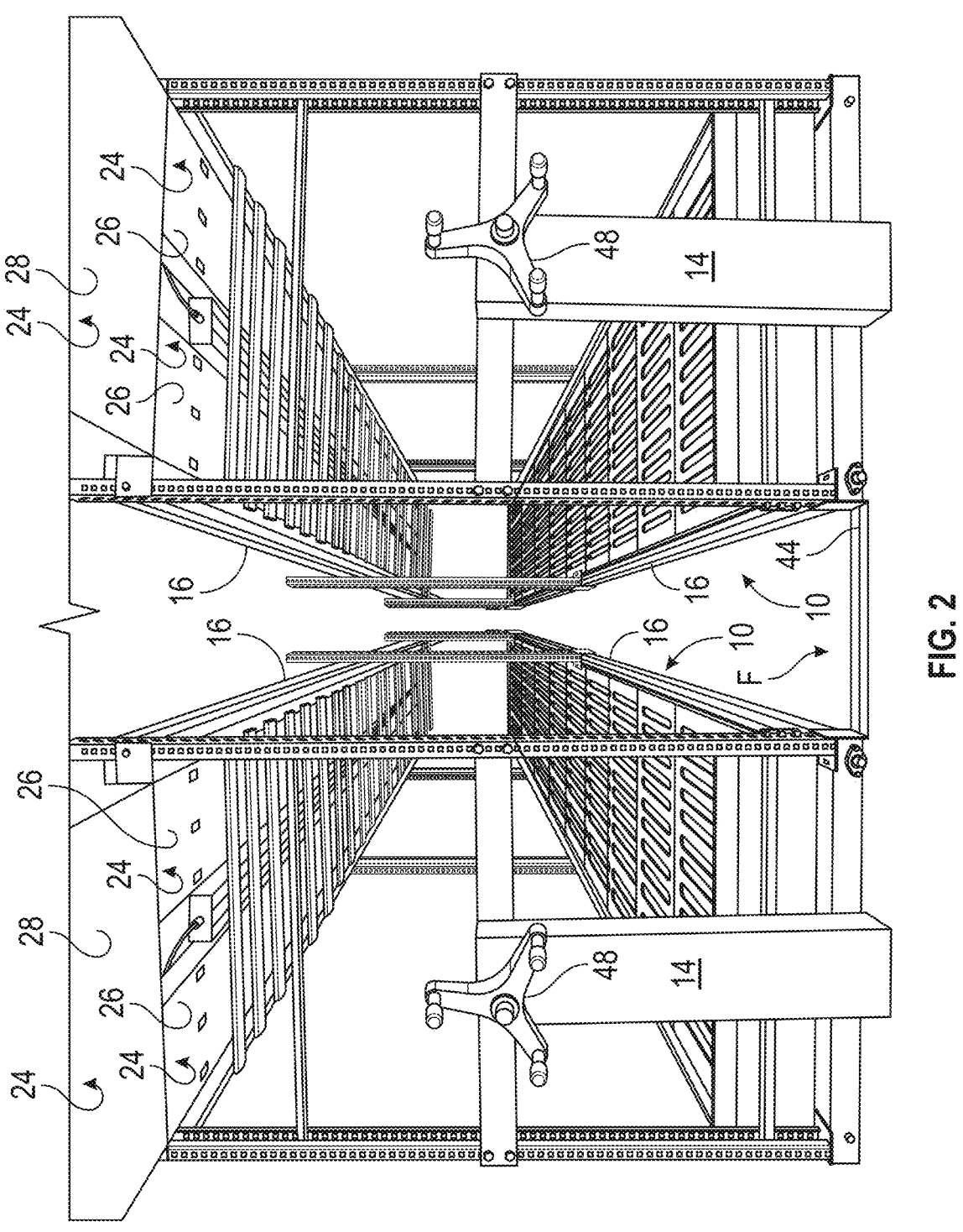
FIG. 2 is a perspective view depicting several of the shelf systems of FIG. 1.
Figure 3:
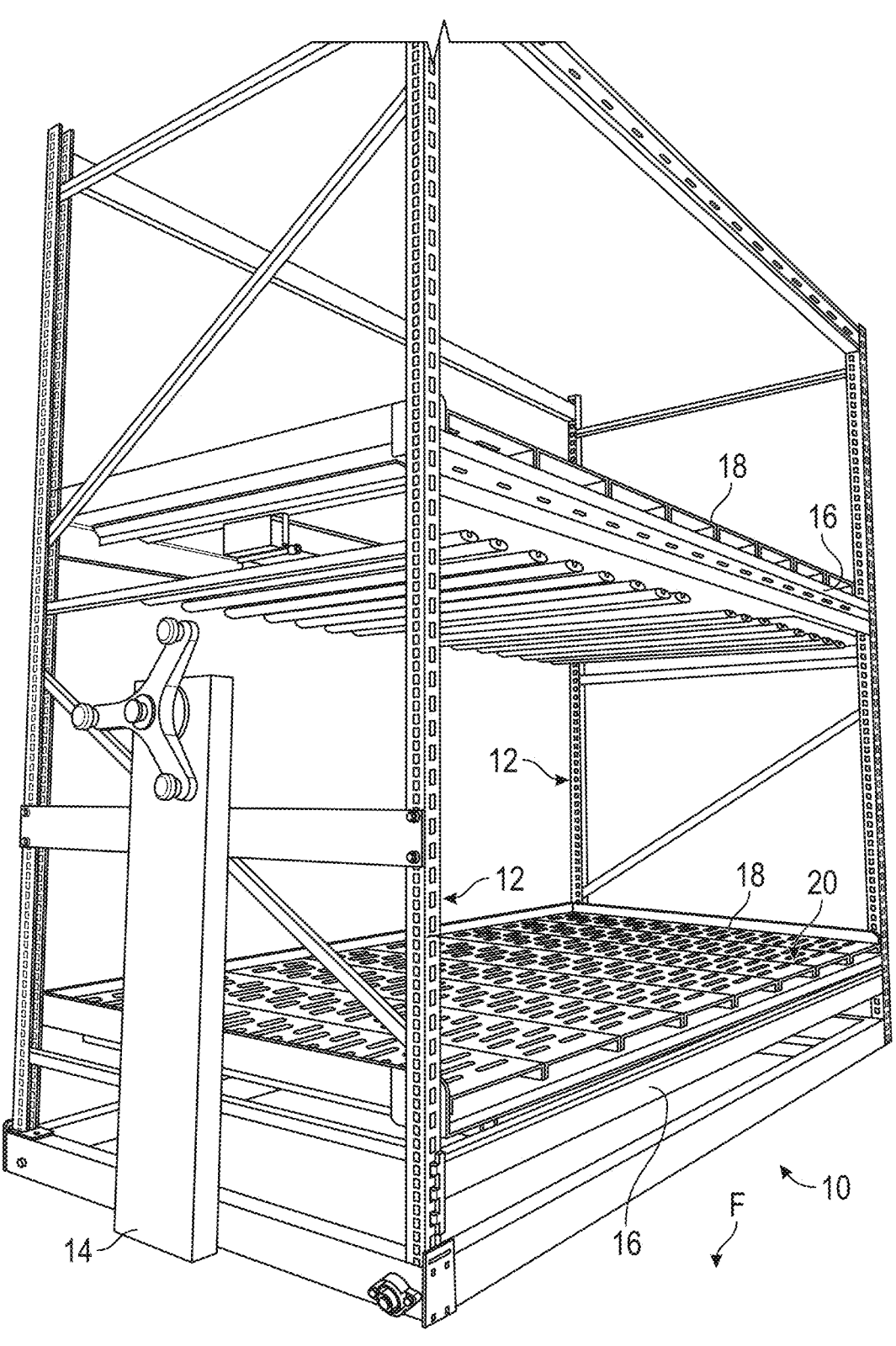
FIG. 3 is another perspective view of another shelf system for plant cultivation, in accordance with the present invention.

Referring now to the drawings and illustrative embodiments depicted therein, a shelving system 10 for plant cultivation includes a frame with at least two upright frame portions 12, a drive mechanism 14 for moving the frame along a floor or other substantially horizontal support surface, at least two vertically-spaced support racks 16, and one or more plant support trays 18 positioned atop each of the support racks 16, such as shown in FIGS. 1-3. Shelving system 10 provides for efficient space utilization, both horizontal and vertical, in plant growing environments such as in greenhouses and other indoor growing areas. To provide such efficiency, support racks 16 are vertically repositionable along upright frame portions 12, which permits additional support racks 16 to be added when they are spaced relatively close to one another in the vertical direction. As will be described in more detail below, drive system 14 permits individual frames of the system to be positioned closely together in side-by-side arrangement, and moved apart only when caretakers must have access to particular racks 16 or the plants that they support.

Figure 4:
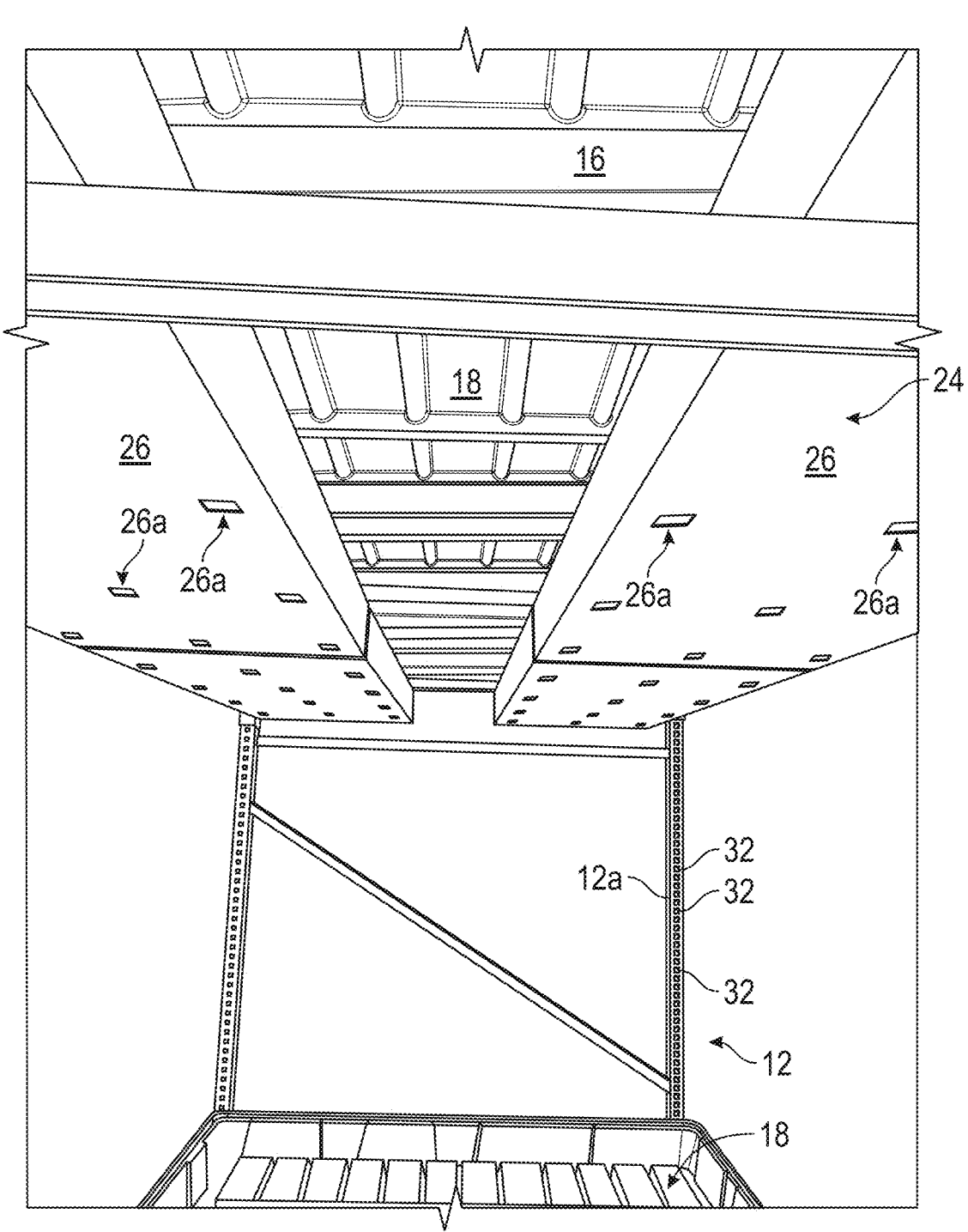
FIG. 4 is a perspective view of a lower portion of a shelf system, with portions removed to show underlying structure.
Figure 5:
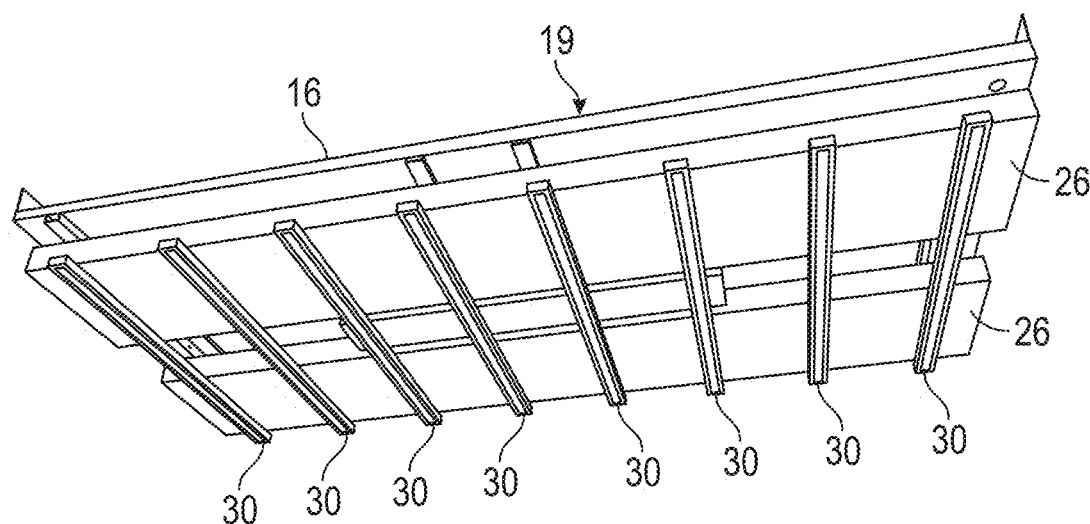
FIG. 5 is another perspective view of a lower portion of a shelf system, similar to that of FIG. 4.
Figure 6:
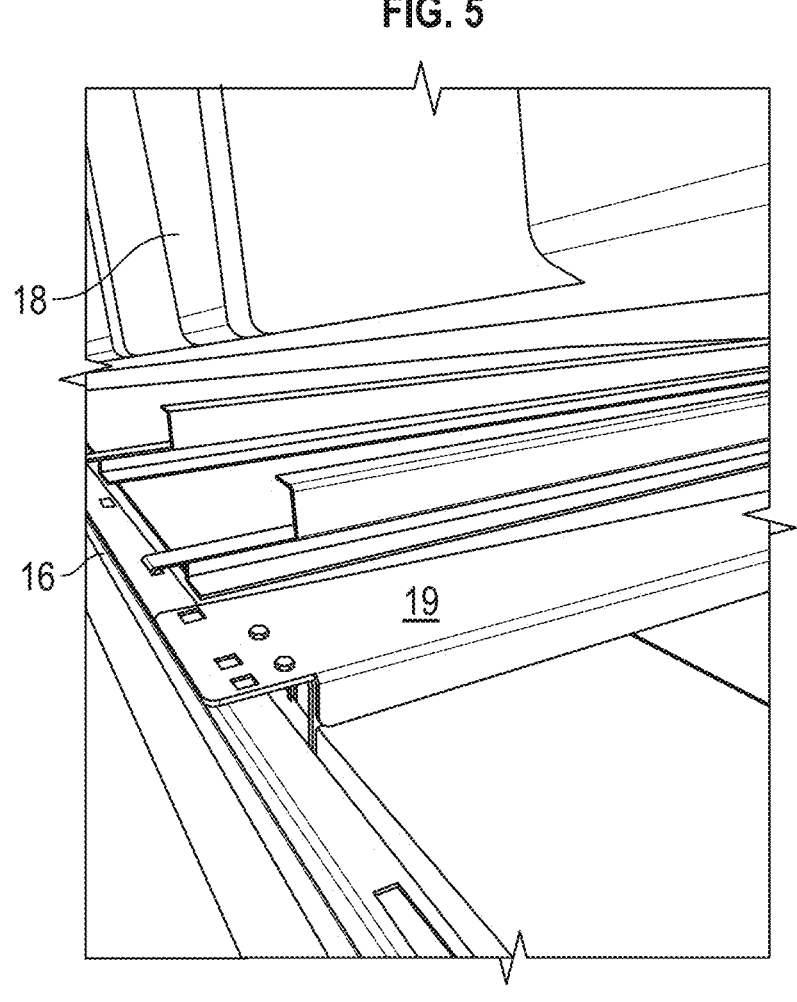
FIG. 6 is a perspective view showing a support structure of the shelf system of FIG. 4, with a tray raised to show underlying structure.
Figure 7:
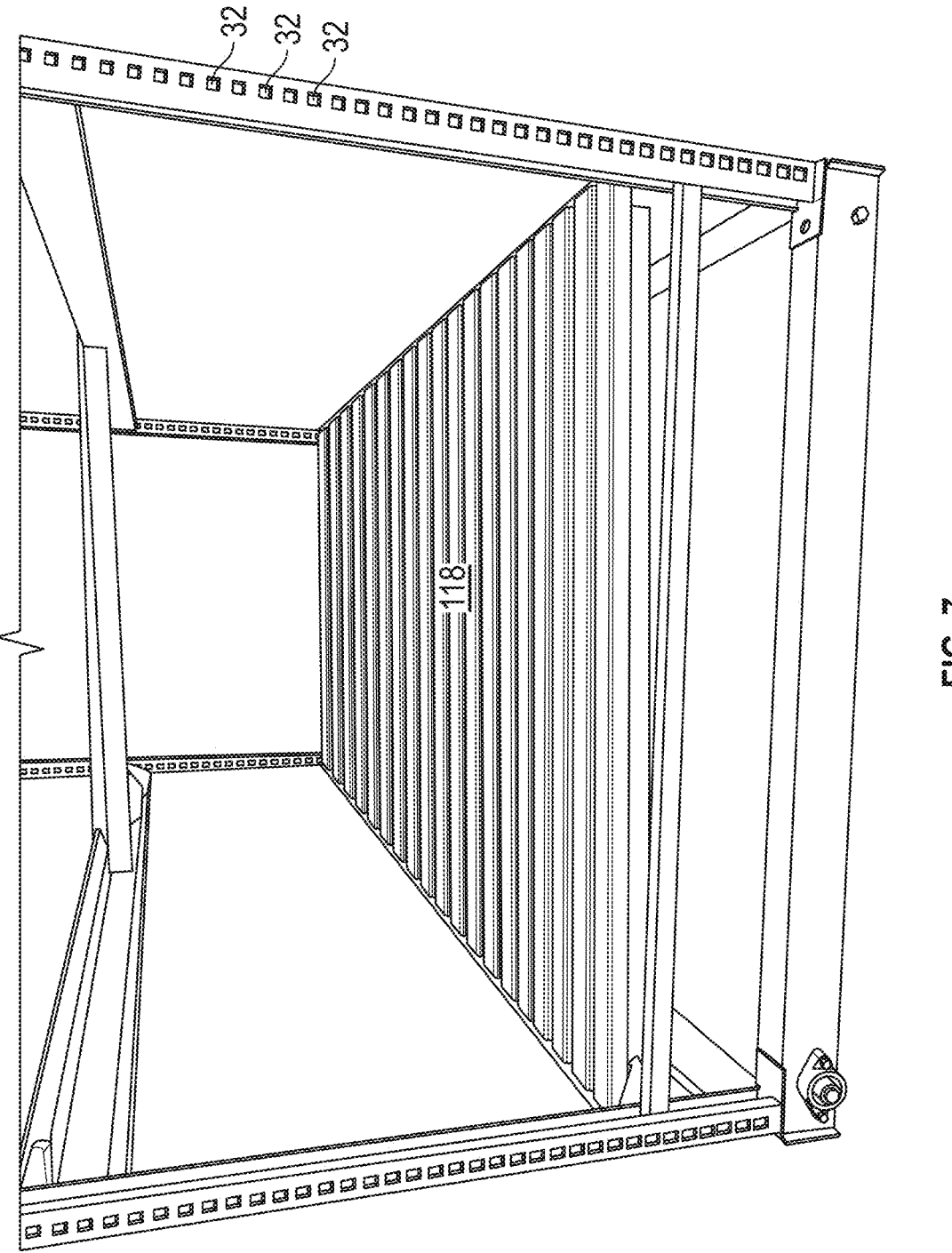
FIG. 7 a perspective end view of a lower portion of another shelf system in accordance with the present invention.
Figure 8:
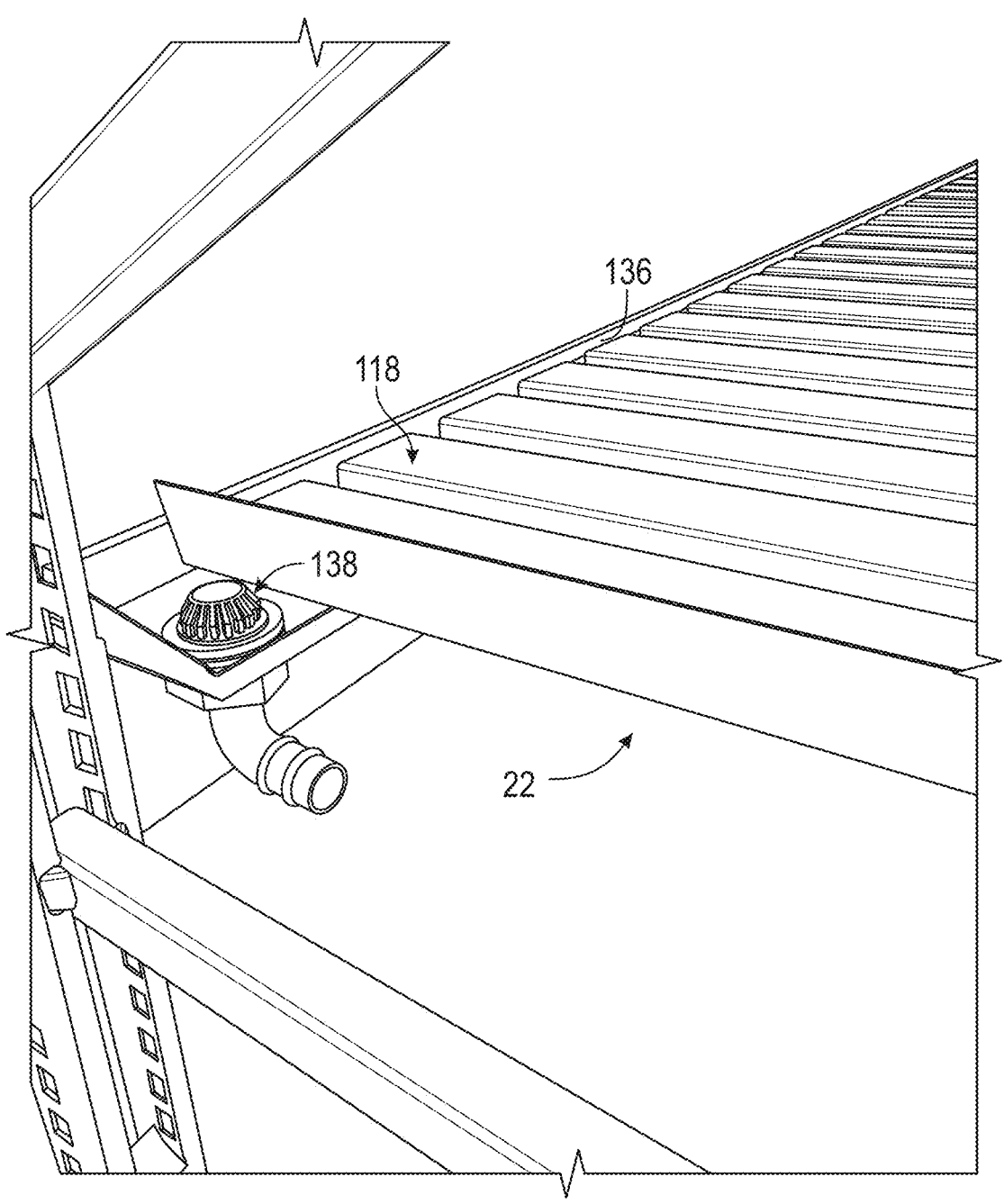
FIG. 8 a perspective view depicting a corner region of the shelf system of FIG. 7.
Figure 9:
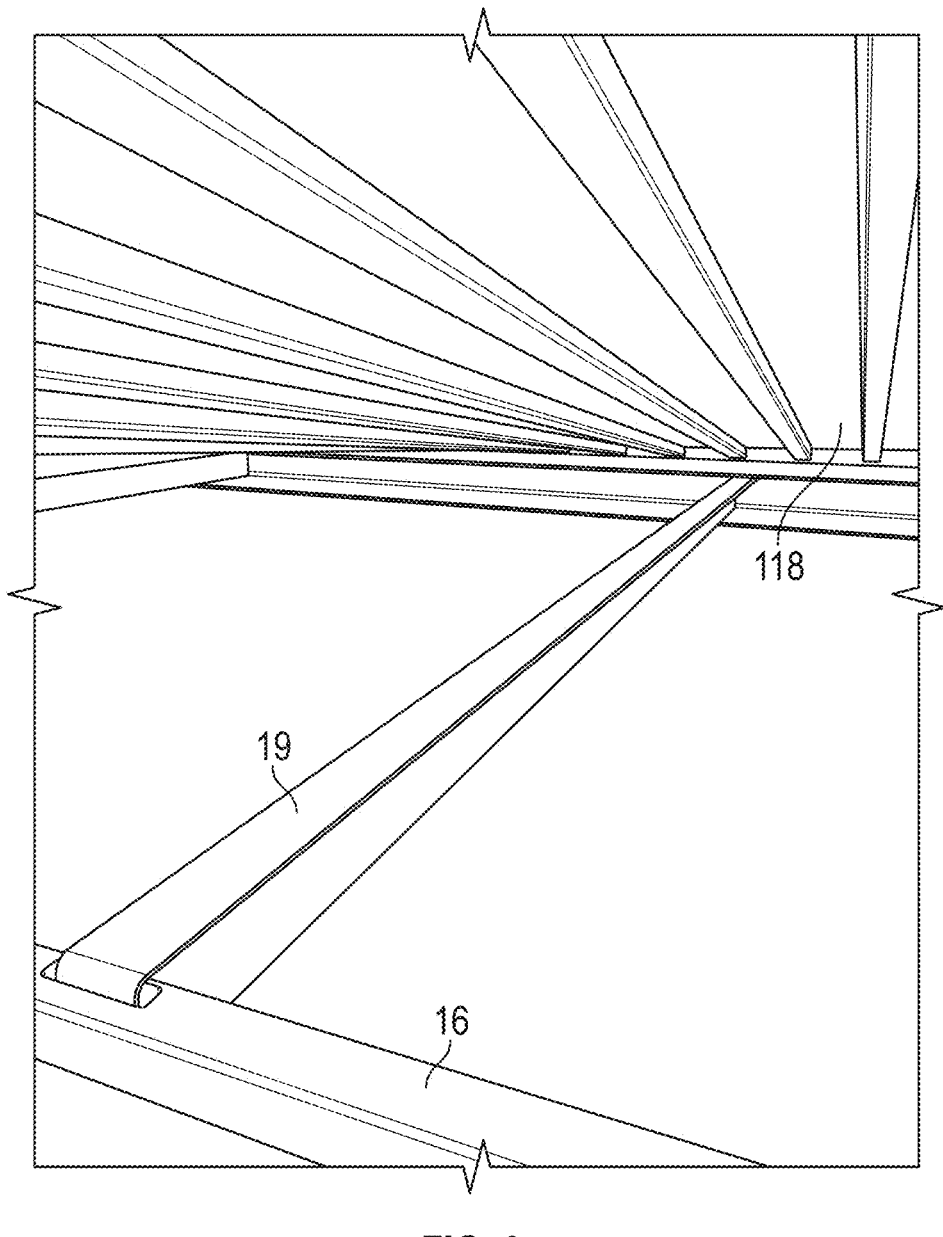
FIG. 9 is a perspective view showing a support structure of the shelf system of FIG. 7, with corrugated support panel raised to show underlying structure.
Figure 10:
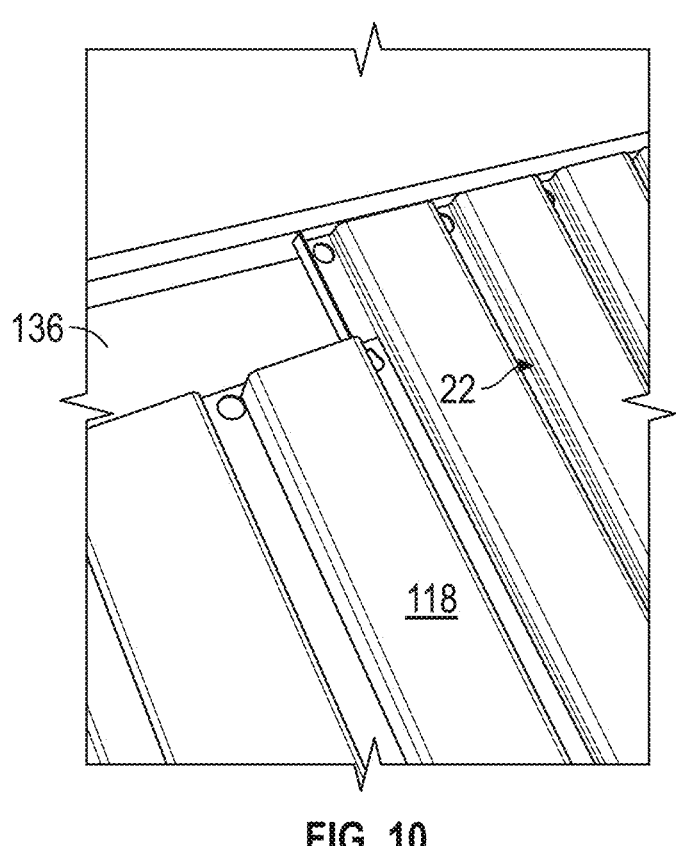
FIG. 10 is a top perspective view of two adjacent and overlapping corrugated support panels and a water runoff trough of the shelf system of FIG. 7.

The vertically-spaced support racks 16 extend between the upright frame portions 12 and may define respective horizontal or substantially horizontal tray-supporting surfaces 19, or may define sloped tray-supporting surfaces to promote drainage. The plant support trays 18 each including a pot supporting surface 20 and a plurality of grooves or channels or openings 22 extending below the pot supporting surface 20, as will be described below in more detail. Optionally, a forced-air ventilation system 24 includes one or more ducts 26 disposed below and supported by an upper support rack 16, such as shown in FIGS. 2, 4 and 5. In the illustrated embodiment of FIGS. 2 and 4, ventilation system 24 includes a manifold duct 28 having a blower motor (not shown) mounted thereto, with two ducts 26 in fluid communication with manifold duct 28. Ventilation system 24 can direct air or other gases (such as air with elevated carbon dioxide levels) onto and around plants supported in trays 18 via duct openings 26*a*. A lighting system including electric lamps 30 is supported below the upper support rack 16 and below the ducts 26. Electric lamps 30 may be LED grow lamps or substantially any suitable lighting for the plants being cultivated on the system 10.

Figure 30:
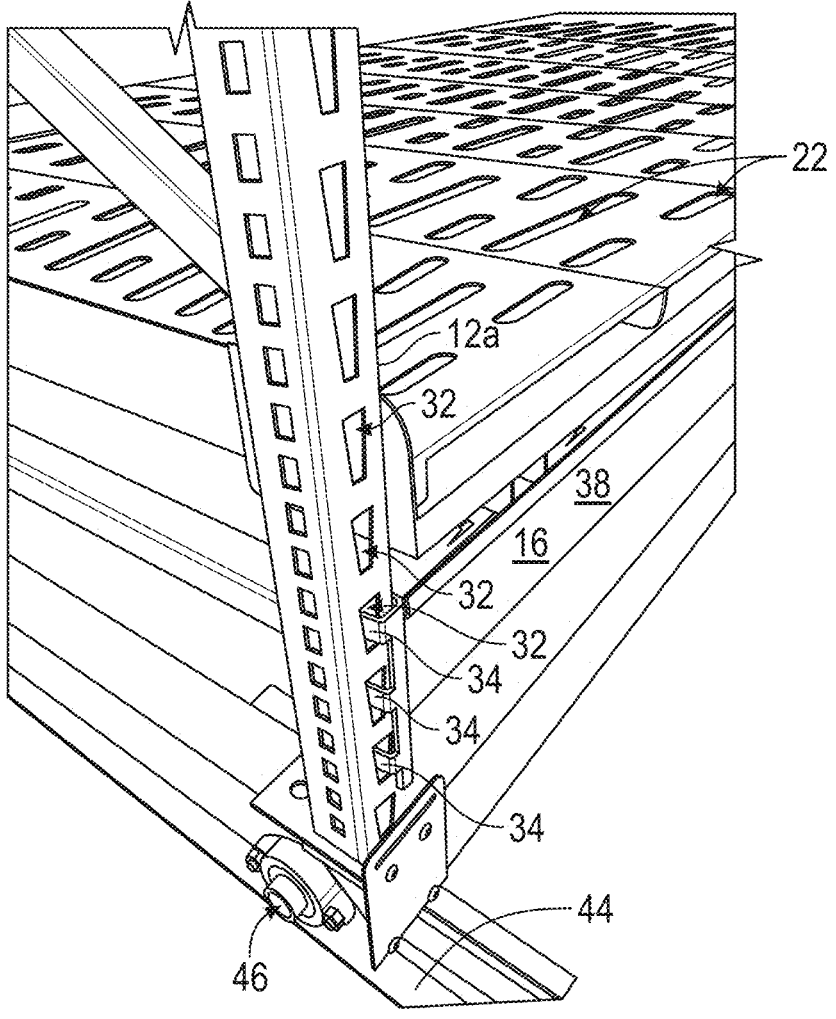
FIG. 30 is a perspective view of a corner region at a lower portion of the shelf system of FIG. 1.

In the illustrated embodiment, each of the upright frame portions 12 includes a pair of vertical posts 12*a*, each with a plurality of vertically-spaced securing elements in the form of slots or openings 32 for engaging corresponding respective securing elements in the form of stud-flanges or hooks 34 of the support racks 16, such as shown in FIG. 30. The support racks 16 are vertically adjustable along the vertical posts 12*a* via selective engagement of the support rack securing elements 34 with the vertical post securing elements 32.

Figure 15:
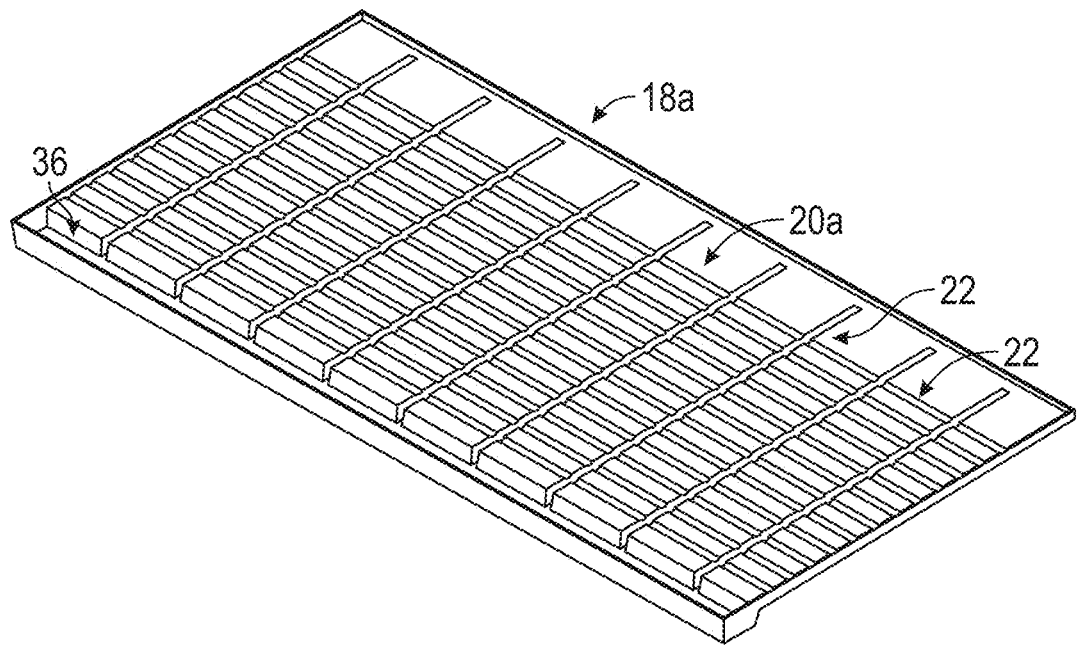
FIG. 15 is a top perspective view of a plant support tray in accordance with the present invention, having a grid pattern of drainage and airflow channels, a full-length trough, and built-in runoff slope.
Figure 16:
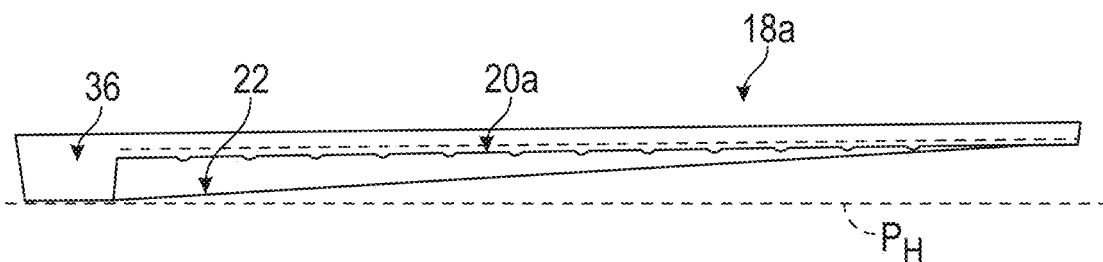
FIG. 16 is an end elevation of the plant support tray of FIG. 15.
Figure 25:
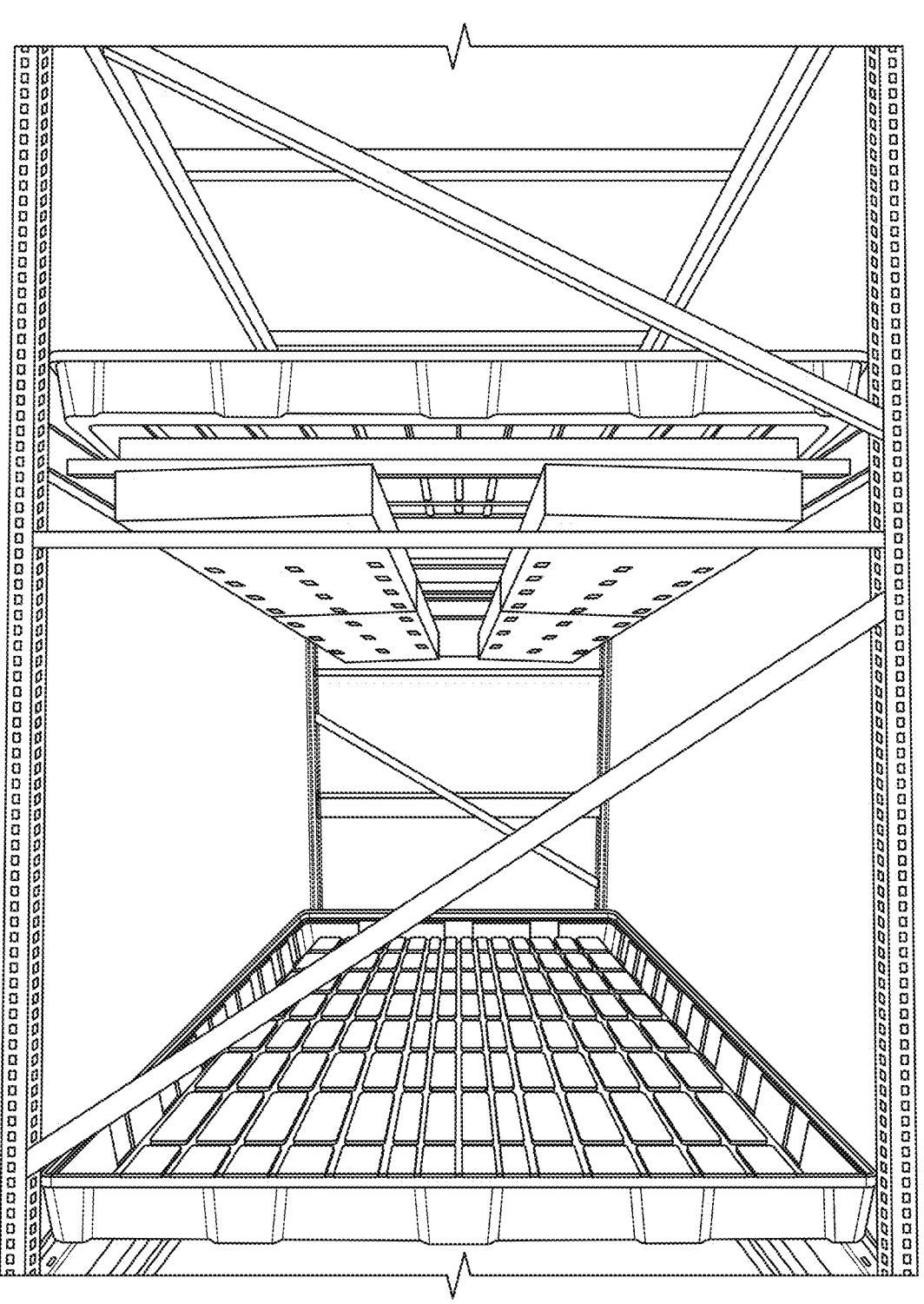
FIG. 25 is a perspective end view of the shelf system of FIG. 24.

Various forms or configurations of plant support trays 18 are envisioned, typically formed from a single piece of sheet metal, molded or thermoformed or machined resinous plastic, or a combination of metal and plastic components. For example, and with reference to FIGS. 15 and 16, plant support trays 18*a* may be configured so that the pot supporting surface 20*a* is level and parallel to a level horizontal plane $P_H$ (FIG. 16) when a tray-supporting surface 19 of the support rack 16 defines a sloped plane (see, e.g., FIG. 25), while the plurality of grooves or channels or openings define water-carrying surfaces or channels 22 that are sloped relative to the horizontal plane $P_H$ when the plant support trays are supported at the support racks.

Figure 16A:
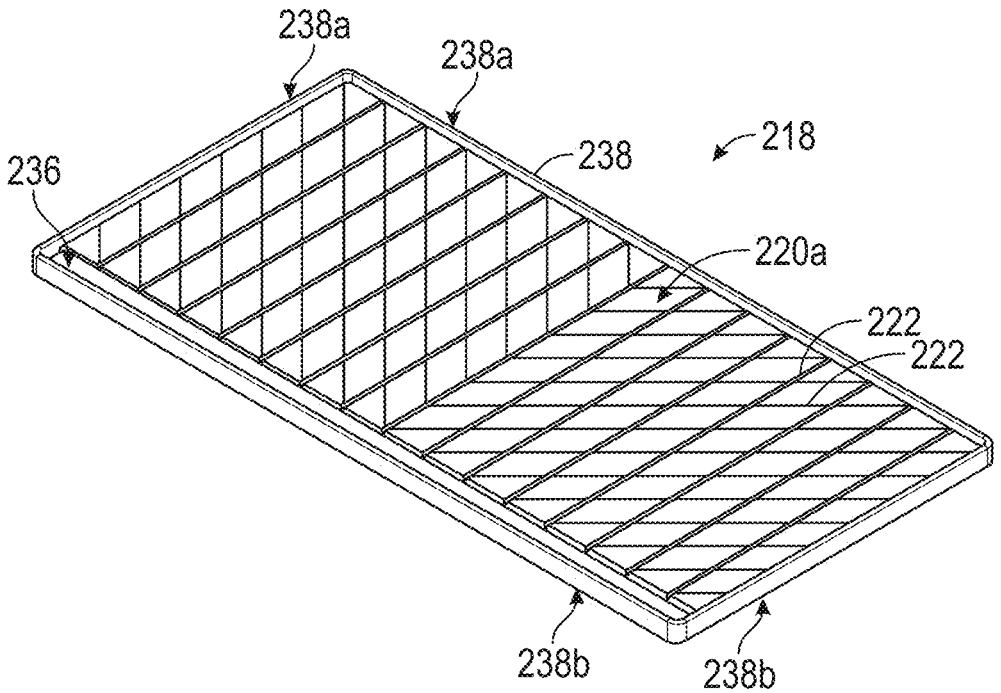
FIG. 16A is a top perspective view of another plant support tray in accordance with the present invention, having a grid pattern of drainage and airflow channels, a full-length trough, and built-in runoff slope.
Figure 16B:
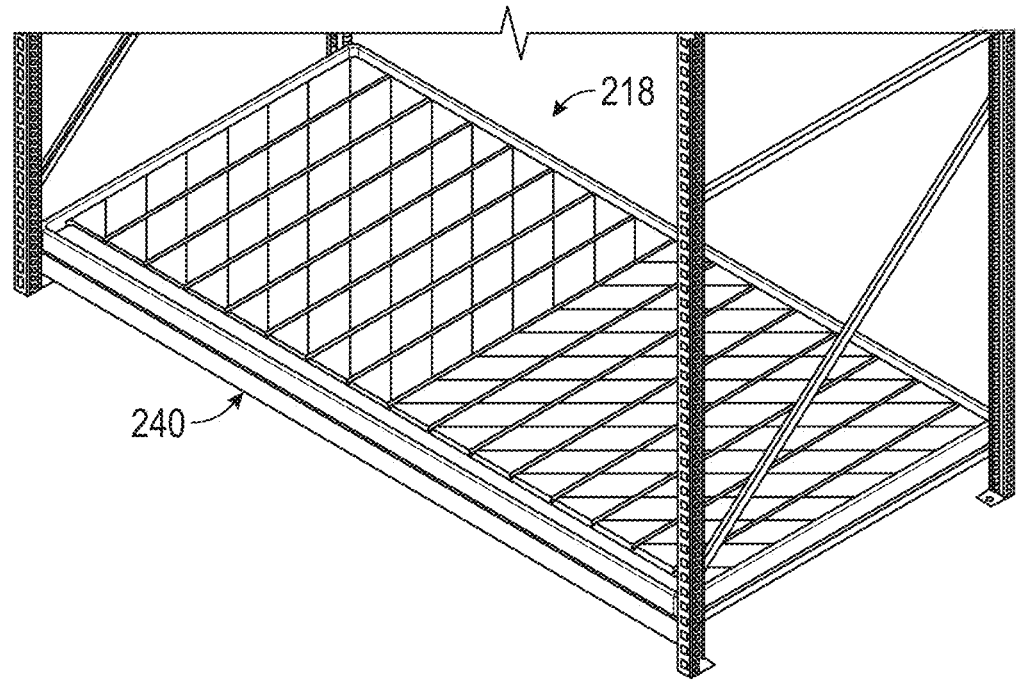
FIG. 16B is another top perspective view of the plant support tray of FIG. 16A, shown supported at a rack-supported shelf.
Figure 16C:
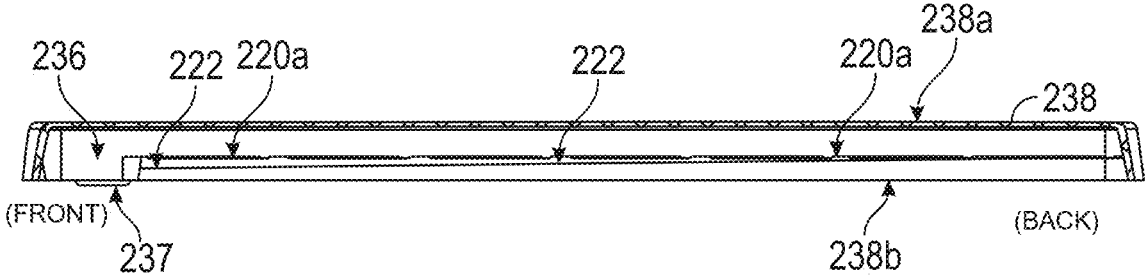
FIG. 16C is a left side sectional elevation of the plant support tray of FIG. 16A.

Referring to FIGS. 16A-16E, a similar plant tray 218 is depicted as having a series of channels 222 arranged in a pattern of parallelograms (FIGS. 16A and 16B), with all channels 222 sloping down to a trough 236. The plant support tray 218 has a perimeter wall 238 with a top or upper edge or edge portion 238*a* that is parallel to its bottom or lower edge or edge portion 238*b*, so that the top edge 238*a* is in a plane parallel to the plane in which the bottom edge 238*b* lies (FIG. 16C). Therefore, when the tray 218 is supported on a level shelf 240, such as shown in FIG. 16B, both the top edge 238*a* and bottom edge 238*b* of the perimeter wall 238 are level.

Figure 16D:
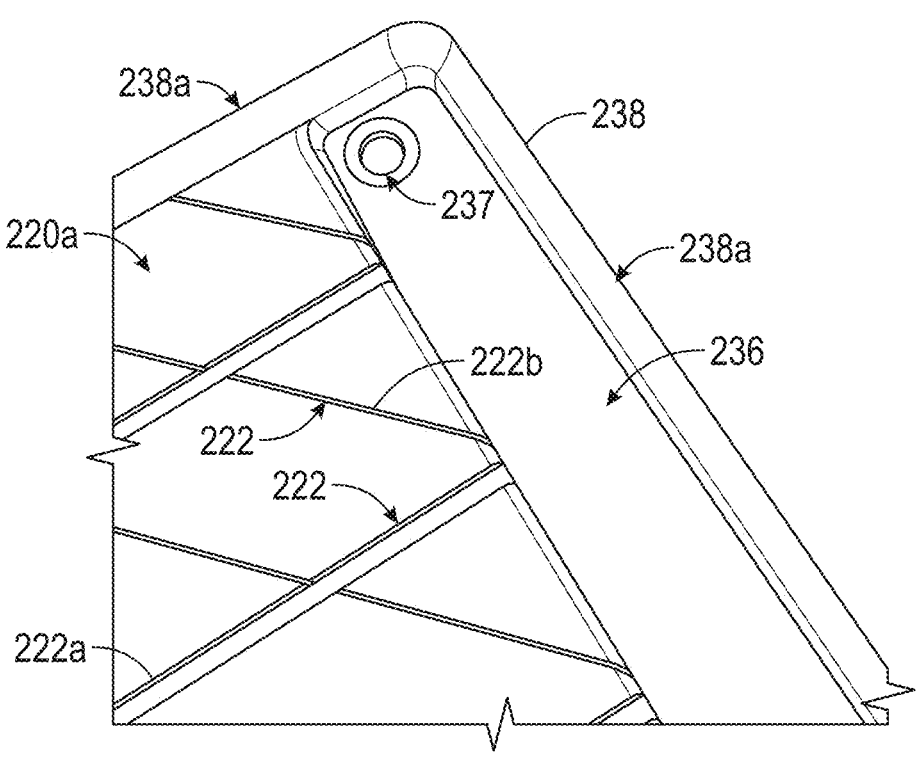
FIG. 16D is a top perspective view of a corner region of the plant support tray of FIG. 16A.
Figure 16E:
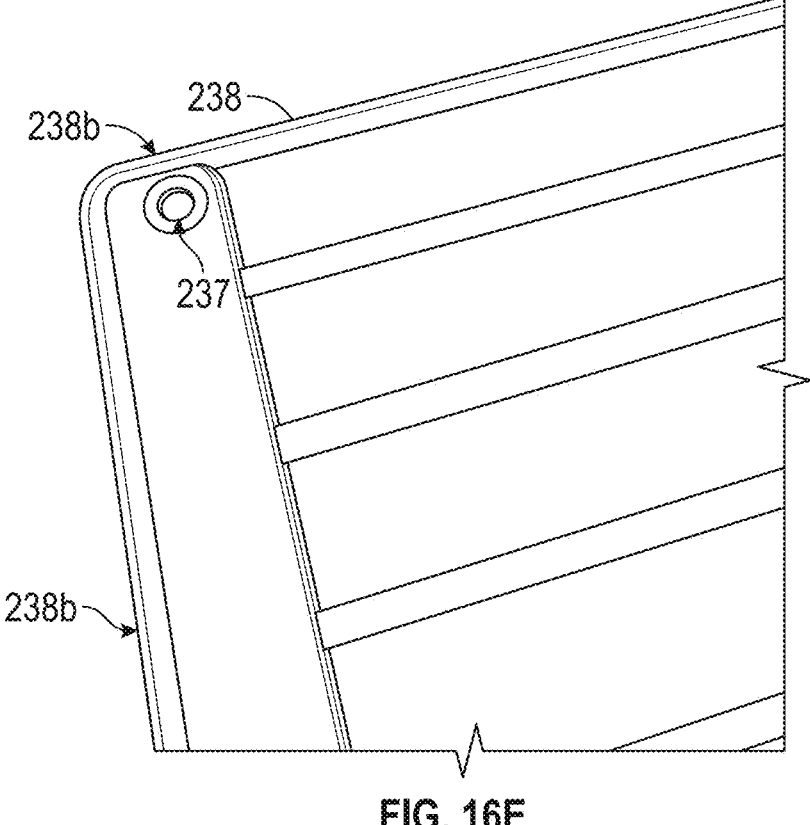
FIG. 16E is a bottom perspective view of the corner region of FIG. 16D.

A plant support surface 220*a* is spaced inwardly from the perimeter wall 238 with a front end region near a front end of the tray 218 and a back end region near a back end of the tray 218 (FIG. 16C), and is also substantially planar except for the series of drainage channels 222 formed in it (FIG. 16A). In the illustrated embodiment of FIGS. 16A-16E, and as best shown in FIG. 16D, channels 222 may include primary channels 222*a* that extend from the back end of the tray 218 to the trough 236 at the front end of the tray 218, and secondary channels 222*b* that are set diagonally to the primary channels 222*a*. Referring to FIG. 16C, the plant support surface 220*a* is in a substantially horizontal and intermediate plane that is parallel to the substantially horizontal planes in which the top edge 238*a* and bottom edge 238*b* of the perimeter wall 238 lie, and is spaced between them. With this arrangement, plants in respective pots can be placed on the plant support surface 220*a*, and any runoff or leak-out water will run down into the channels 222 and will also be contained by the top edge 238*a* of the perimeter wall 238.

At least the primary drainage channels 222*a* are sloped so that they are relatively shallow (i.e., they bottom out a short distance below the plant support surface) at the back of the tray, and so that they are relatively deep (i.e., they bottom out a further distance below the plant support surface) at the front of a tray, where the collection trough 236 is located. The collection trough 236 is also sloped (from upper-left to bottom-right in FIG. 16A) down to a drainage opening 237 at one end. Thus, the plant support tray 218 can sit on a level shelf 240, with plants supported in pots on a level plant support surface 220*a*, and any water runoff will still be channeled "downhill" in the channels 222, toward the front of the tray and down to the drain 237 for collection.

Referring now to FIGS. 36-47, a similar plant tray 318 is depicted as having a series of channels 322 arranged to generally form a pattern of polygons similar to parallelograms (FIGS. 36 and 37), with all channels 322 sloping down to a trough 336. The plant support tray 318 has a perimeter wall 338 with a top edge 338*a* that is parallel to its bottom edge 338*b*, so that the top edge 338*a* is in a plane parallel to the plane in which the bottom edge 338*b* lies, such as shown in FIGS. 38-45. Therefore, when the tray 318 is supported on a level support shelf (similar to what is shown in FIG. 16B), both the top edge 338*a* and bottom edge 338*b* of the perimeter wall 338 are level.

Figure 36:
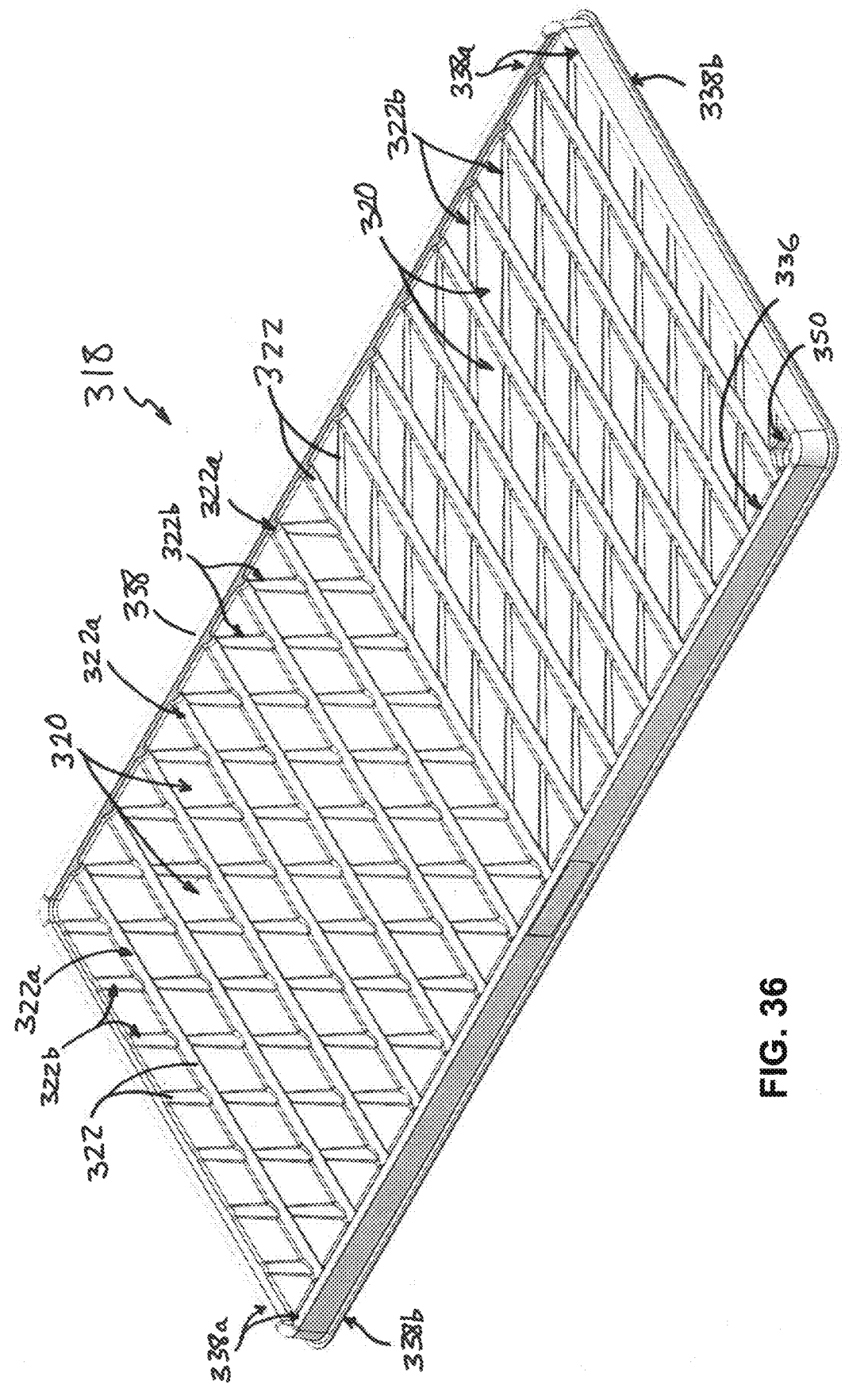
FIG. 36 is a top-front perspective view of another plant support tray in accordance with the present invention.
Figure 37:
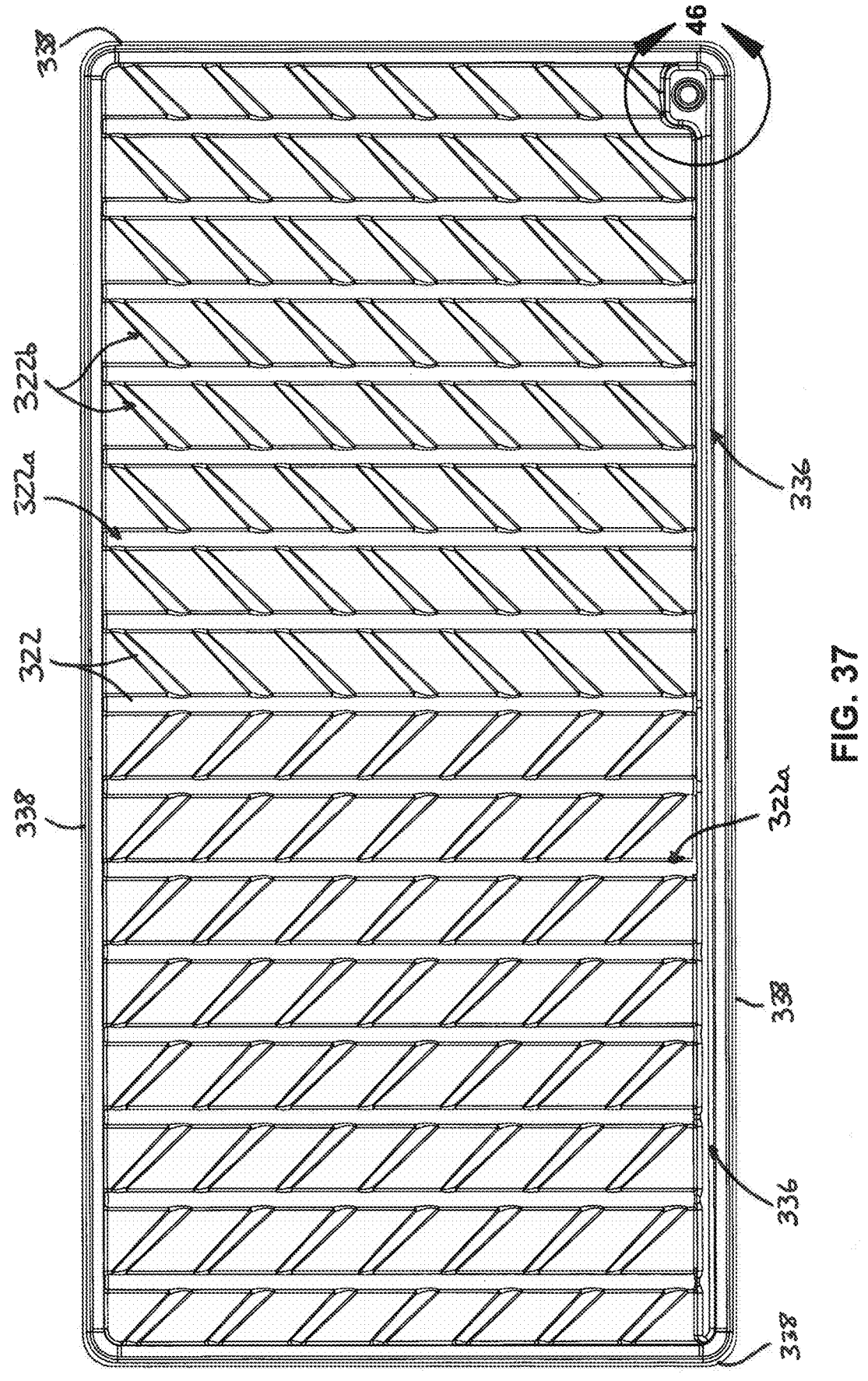
FIG. 37 is a top plan view of the plant support tray of FIG. 36.

A plant support surface 320 is spaced inwardly from the perimeter wall 338, and is also substantially planar except for the series of drainage channels 322 formed in it. In the illustrated embodiment of FIGS. 36-45, and as best shown in FIGS. 36 and 37, channels 322 include primary channels 322*a* that extend from a back of the tray 318 to the trough 336 at the front of the tray, and secondary channels 322*b* that are set diagonally to the primary channels 322*a*. As best seen in FIG. 37, secondary channels 322*b* may have a narrower width at their upper (further-rearward) end portions, and a greater width at their lower (further forward) end portions. It will be appreciated that the lower end portions may be expected to carry a greater volume of water than the upper end portions, such that water can be more readily directed off of the plant support surface 320 and into the secondary channels 322*b* that are shaped this way.

Figures 38, 39, 40:
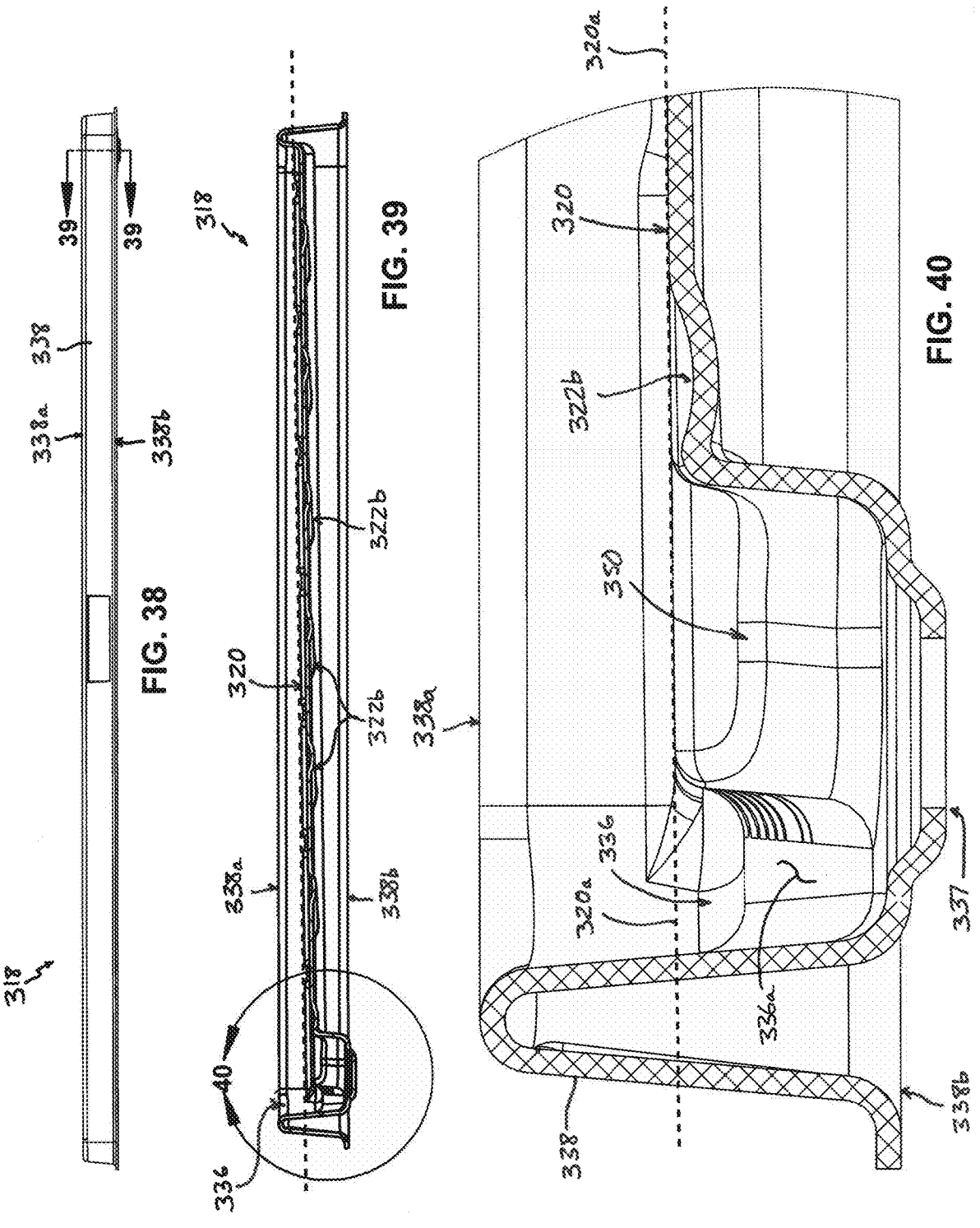
FIG. 38 is a front elevation view of the plant support tray of FIG. 36.
FIG. 39 is a side sectional elevation of the plant support tray, taken through line 39-39 in FIG. 38.
FIG. 40 is an enlarged view of the region designated '40' in FIG. 39.
Figures 41, 42, 43:
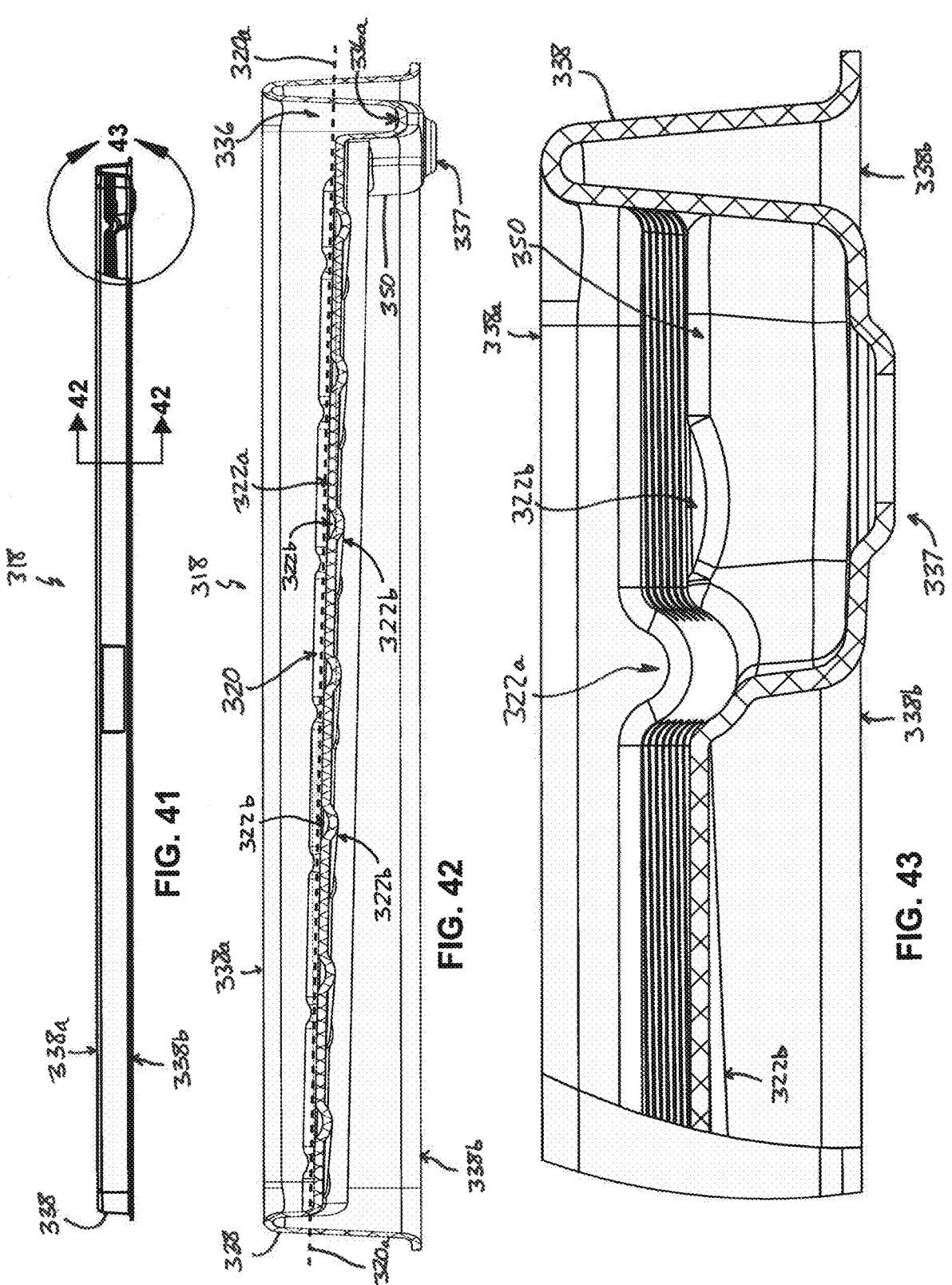
FIG. 41 is another front elevation view of the plant support tray of FIG. 36, including a cutaway region showing hidden structures.
FIG. 42 is a side sectional elevation of the plant support tray of FIG. 36, taken through line 42-42 in FIG. 41.
FIG. 43 is an enlarged view of the cutaway region designated '43' in FIG. 39.
Figures 44, 45:
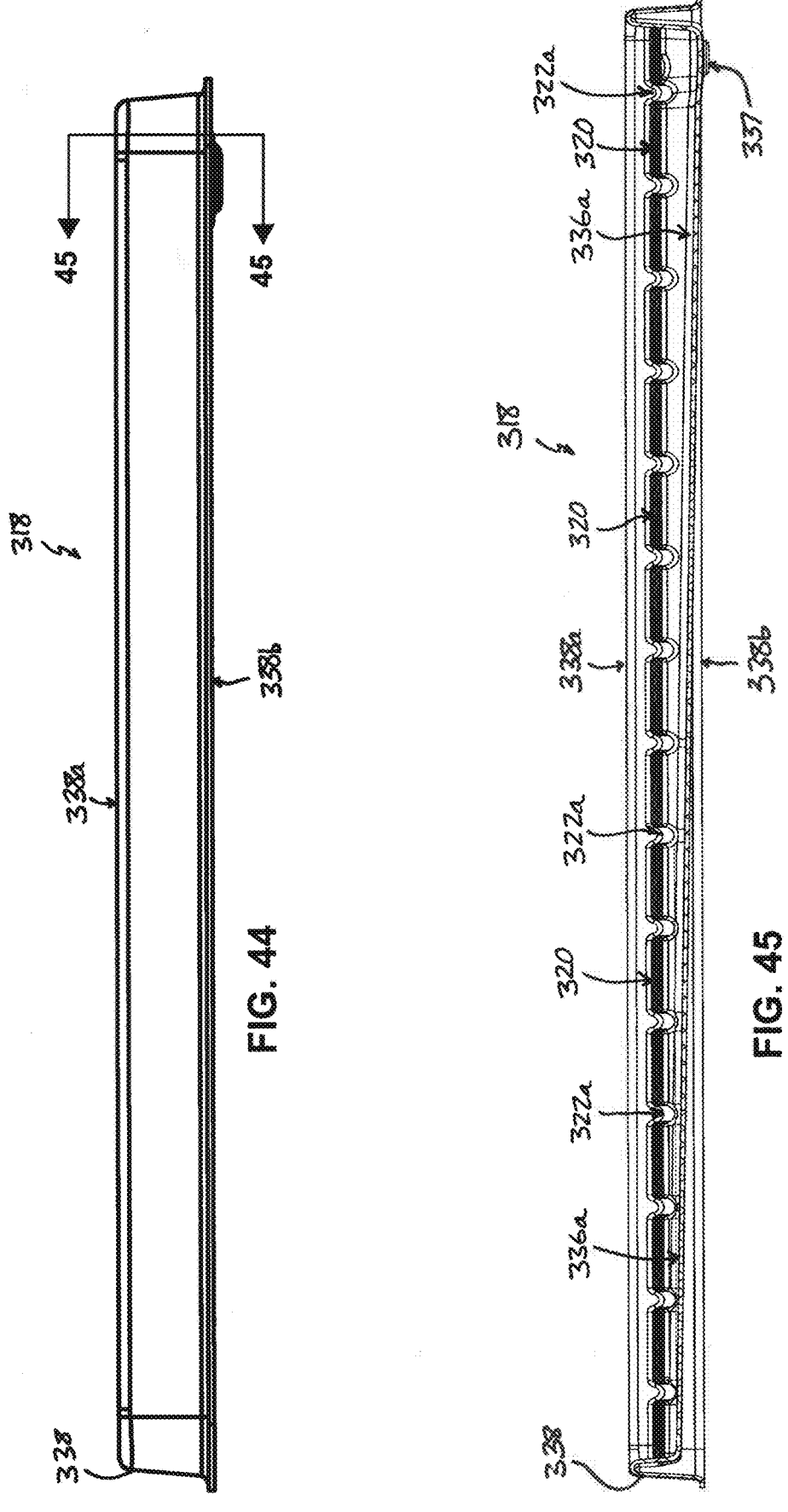
FIG. 44 is a side elevation of the plant support tray of FIG. 36.
FIG. 45 is a front sectional elevation of the plant support tray of FIG. 36, taken through line 45-45 in FIG. 44.

Referring to FIGS. 39, 40, and 42, the plant support surface 320 lies in a plane 320*a* that is angled slightly relative to the substantially horizontal planes in which the top edge 338*a* and bottom edge 338*b* of the perimeter wall 338 lie, and is spaced between them. Plant support surface plane 320*a* is sloped gently downwardly in the direction of trough 336 at the front region of plant tray 318, such as about ⅛$^{th}$ inch per foot of lateral distance, or about ½ inch over a lateral distance of about 4 feet from back to front of a typical 4×8 foot plant tray. With this arrangement, plants in respective pots can be placed on the plant support surface 320, and any runoff or leak-out water will run down into the channels 322, subsequently into trough 336, and will also be contained by the top edge 338*a* of the perimeter wall 338.

Figures 46, 47:
FIG. 46 is an enlarged top plan view of the corner region designated '46' in FIG. 37.
FIG. 47 is an enlarged top plan view of another corner region design for a plant support tray.

The primary drainage channels 322*a* slope downwardly from the back of the tray 318 to the trough 336, and may follow generally the same slope as the plant support surface plan 320*a*. Optionally, and as shown in FIG. 42, the secondary drainage channels 322*b* also extend further below plant support surface 320 at their lower (further forward) end portions than at their upper (further rearward) end portions, to provide slightly greater slope down to the primary channels 322*a* into which they flow. The collection trough 336 has a gently sloped lower surface 336*a* that slopes downwardly (from upper-left to bottom-right in FIG. 45) to a drainage opening or port 337 at one end. The slope of the collection trough's lower surface 336*a* may be about ⅛th inch per foot of lateral distance. In the embodiment of FIGS. 36-46, and as best shown in FIGS. 37, 42, and 46, trough 336 is relatively narrow compared to a wider water collection region 350 surrounding draining port 337, which may support a drain fitting for a hose or gutter system, for example. In the illustrated embodiment, trough 336 has a width of about one inch, which (compared to a wider trough) increases rigidity of plant tray 318 and therefore aids in maintaining the tray's shape when loaded. Referring to FIG. 46, water collection region 350 receives water flow from tough 336, and may also receive water flow directly from a secondary drainage channel 322b, from a primary drainage channel 322a, and from plant support surfaces 320. The plant support tray 318 can sit on a level shelf or rack or frame, with plants supported in pots on the gently sloped plant support surface 320, such any water runoff will be channeled "downhill" in the channels 322, toward the front of the tray and down to the drain 337 for collection.

Figure 17:
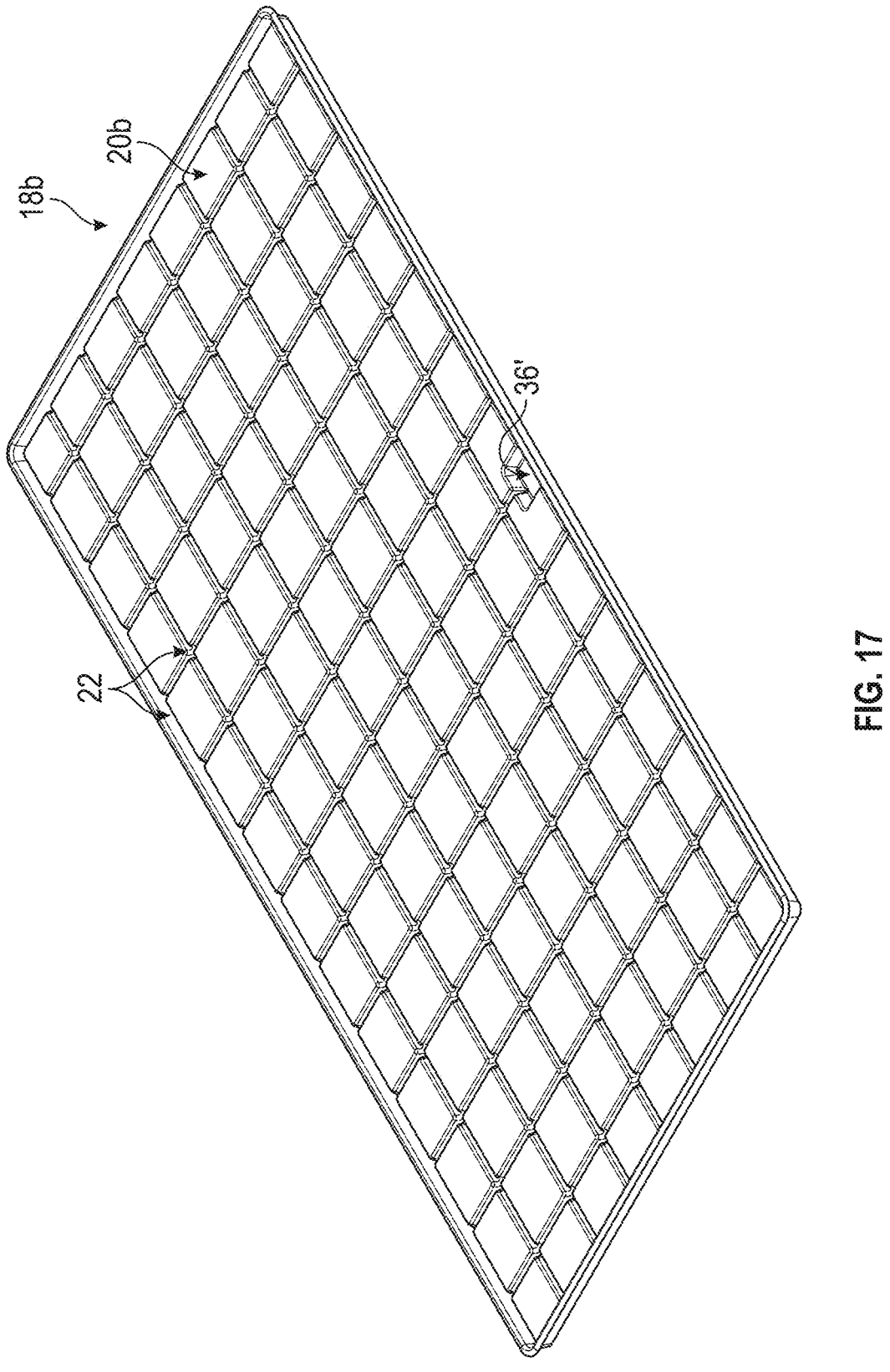
FIG. 17 is a top perspective view of a plant support tray in accordance with the present invention, having a grid pattern of drainage and airflow channels, a small runoff trough, and no built-in runoff slope.
Figure 24:
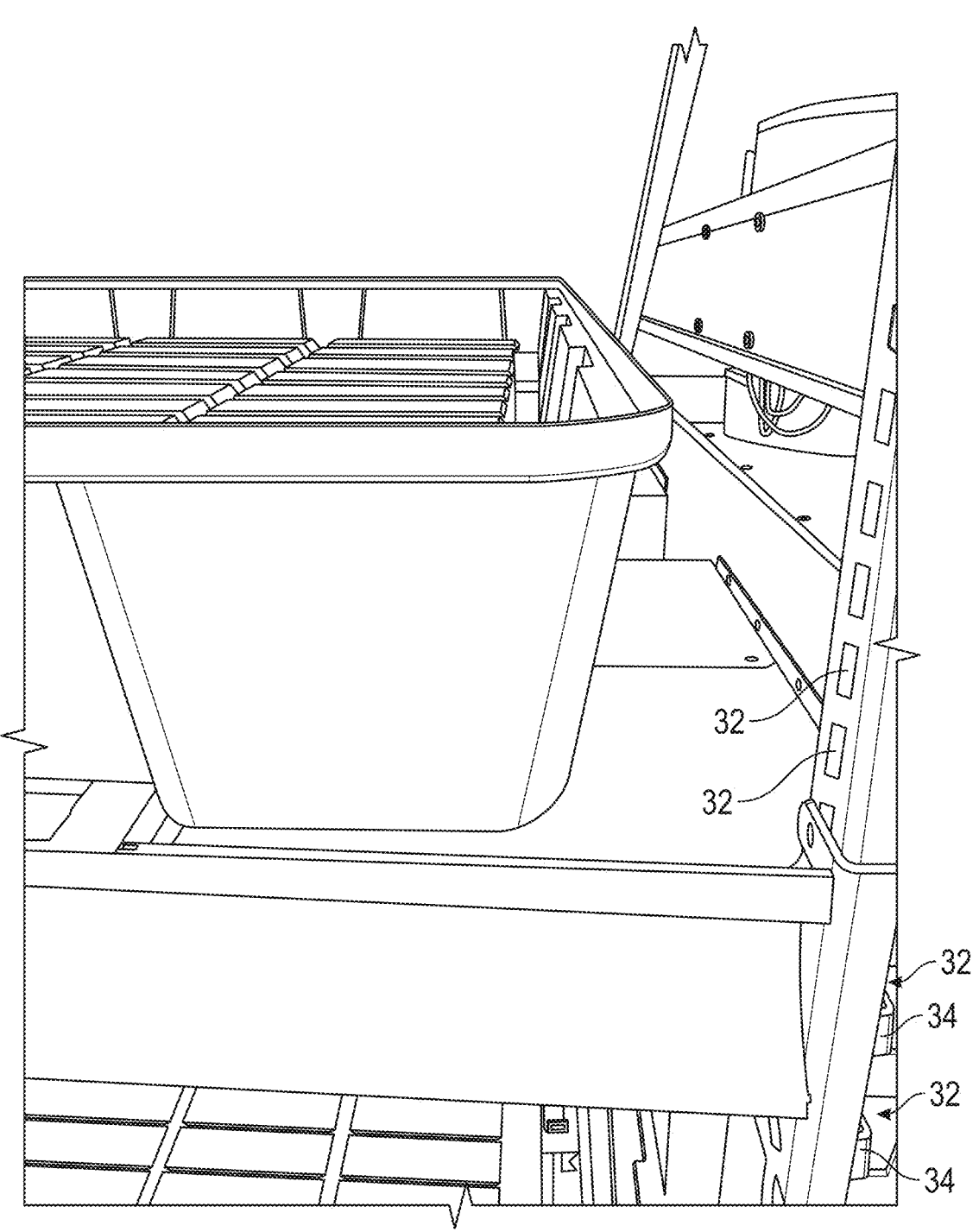
FIG. 24 is a perspective view of another plant support tray supported by support structure of one of the shelf systems for plant cultivation.

In another arrangement, and as shown in FIGS. 17-19, the plant support trays 18b, 18c are configured so that the pot supporting surfaces 20b, 20c are sloped relative to a horizontal plane when a tray-supporting surface of the support rack is also sloped relative to a horizontal plane. To provide sufficient drainage, it is desirable that the plurality of grooves or channels or openings define water-carrying surfaces that are sloped relative to a horizontal plane when the plant support trays 18 are supported at the support racks 16. The support racks 16 may be set at a substantially level horizontal orientation for plant support trays 18b, 18c configured to be supported in that manner, or may be set at a sloped orientation for other plant support trays (such as support tray 18a of FIGS. 15 and 16) configured to rest atop a sloped surface. The plant support trays 18a, 18c, 18d of FIGS. 15, 19 and 21 each include or define an elongate trough 36 at one end or edge portion thereof. Optionally, these elongate troughs 36 are unitarily formed with the pot supporting surfaces 20a, 20c, 20d, and are also unitarily formed with surfaces defining the plurality of grooves or channels or openings, as well as with upstanding sidewalls along outer periphery of each tray 18a, 18c, 18d. Potted plants may be placed at substantially any desired density that is desired along a given plant support tray 18a, 18c, 18d.

Referring now to FIGS. 7-14 there is shown an alternative to one-piece plant support trays 18a, 18c, 18d, in which a corrugated plant support tray 118 is formed from overlapping sections of corrugated or undulating sheet materials, such as stamped sheet metal or thermoformed or molded plastic sheet. Corrugated plant support tray 118 relies upon a separate water runoff trough 136 supported at one of the support racks 16 at an end of the corrugated or undulating sheet material 118. The water runoff trough 136 is configured to receive a flow of water from channels 22 of the corrugated or undulating sheet material 118, and to direct the flow of water to a drain fitting 138 positioned in a drain opening 137 formed in the water runoff trough 136. Sheet material 118 may be formed with end flanges having extra height, to ensure that potted plants are contained on the tray and that water is channeled down to the trough 136.

Figure 11:
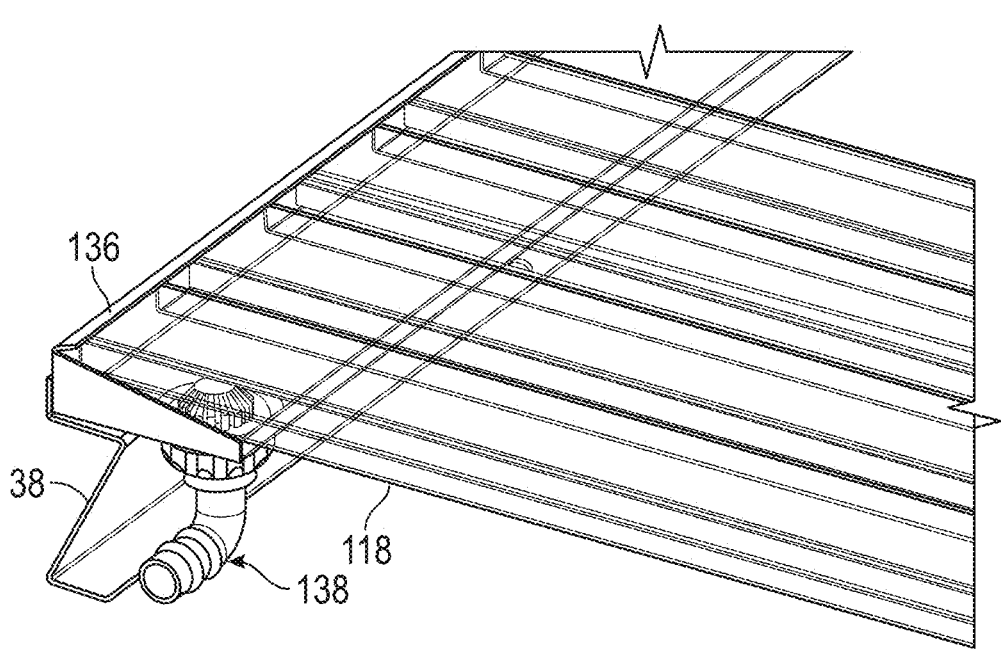
FIG. 11 is another perspective view depicting a corner region of the shelf system of FIG. 7, with corrugated panels shown in transparency to show underlying structure.
Figure 12:
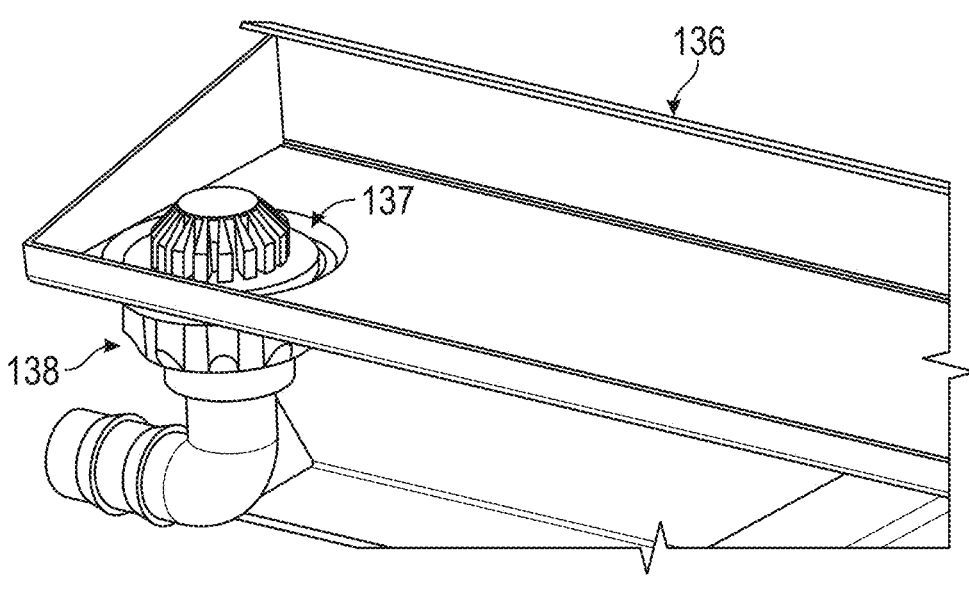
FIG. 12 is a perspective view of an end portion of the water runoff trough of the shelf system of FIG. 11, with corrugated panels omitted to show underlying structure including a drain fitting.
Figure 13:
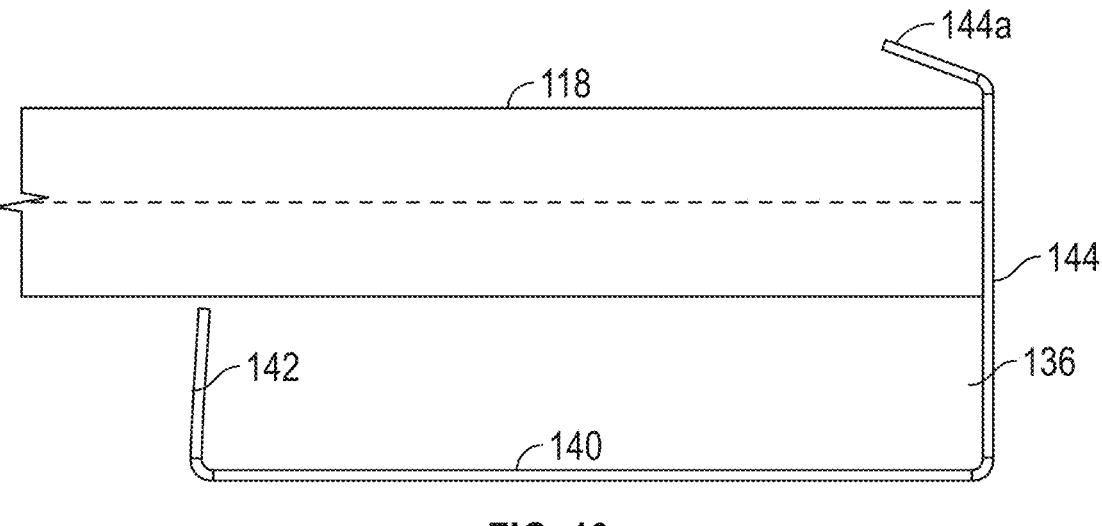
FIG. 13 is an end elevation depicting the corrugated panel and water runoff trough of FIGS. 7-12.
Figure 14:
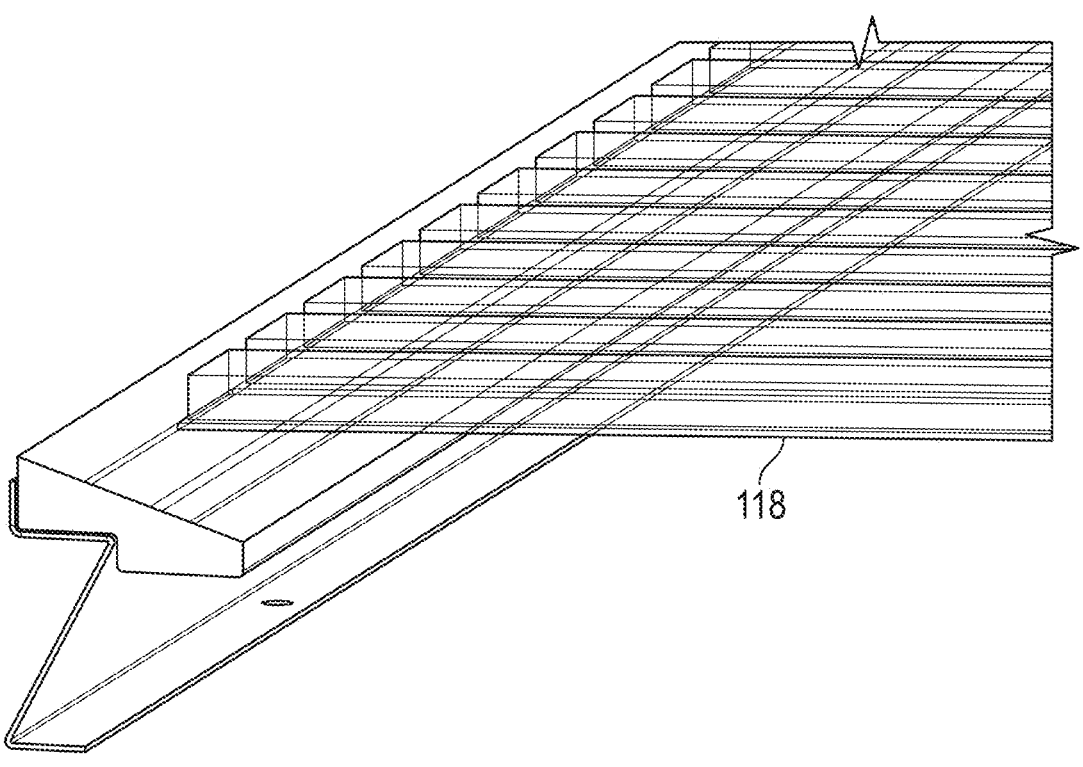
FIG. 14 is a perspective view depicting a corner region of a shelf system similar to that of FIG. 7, with corrugated panels shown in transparency to show underlying structure including an alternative water runoff trough.

The water runoff trough 136 includes a bottom wall 140 and first and second upright walls 142, 144 extending upwardly from opposite edges of the bottom wall 140, such as shown in FIGS. 11-13. The first upright wall 142 has a lower height than the second upright wall 144, and the first upright wall 142 is configured to support an end of the corrugated or undulating sheet material 118. The height of the second upright wall 144 exceeds the height of the end of the corrugated or undulating sheet material 118 resting atop the first upright wall 142, such as shown in FIGS. 11-13. An optional flange 144a extends upwardly and rearwardly from an upper end of second upright wall 144, in the direction of first wall 142, and helps to ensure that channeled water is substantially all directed down along bottom wall 140.

Figure 31:
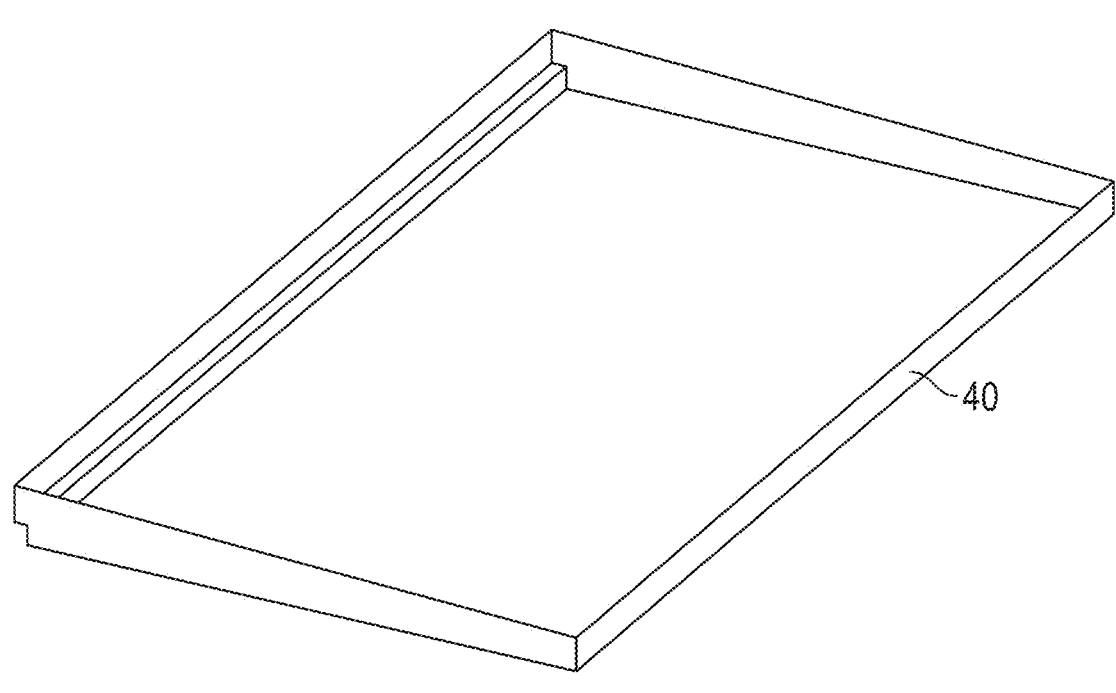
FIG. 31 is a perspective view of another plant support tray in accordance with the present invention.
Figure 32:
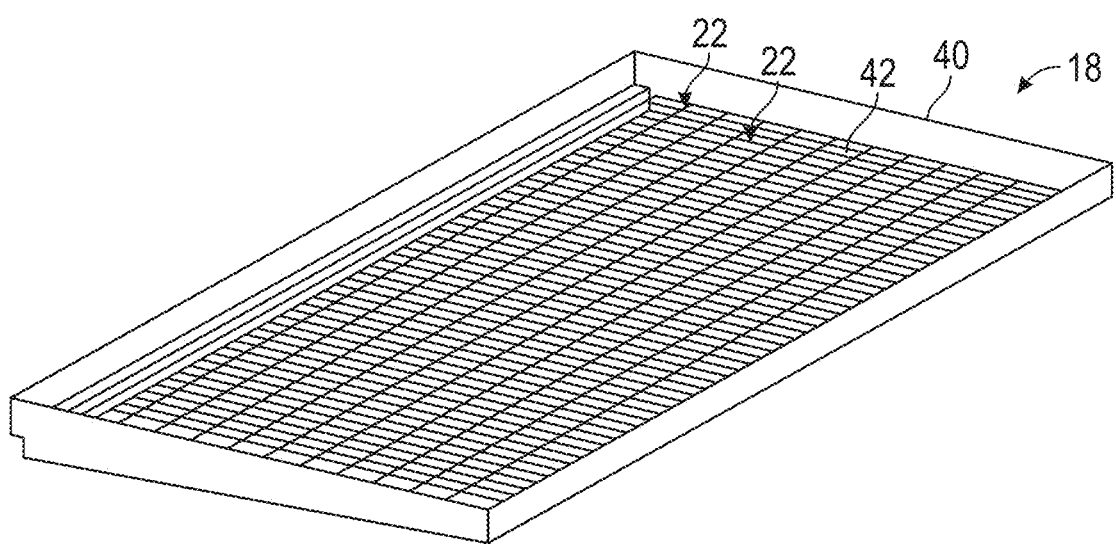
FIG. 32 is a perspective view of the plant support tray of FIG. 31, shown fitted with a wire rack plant support insert.
Figures 33, 34:
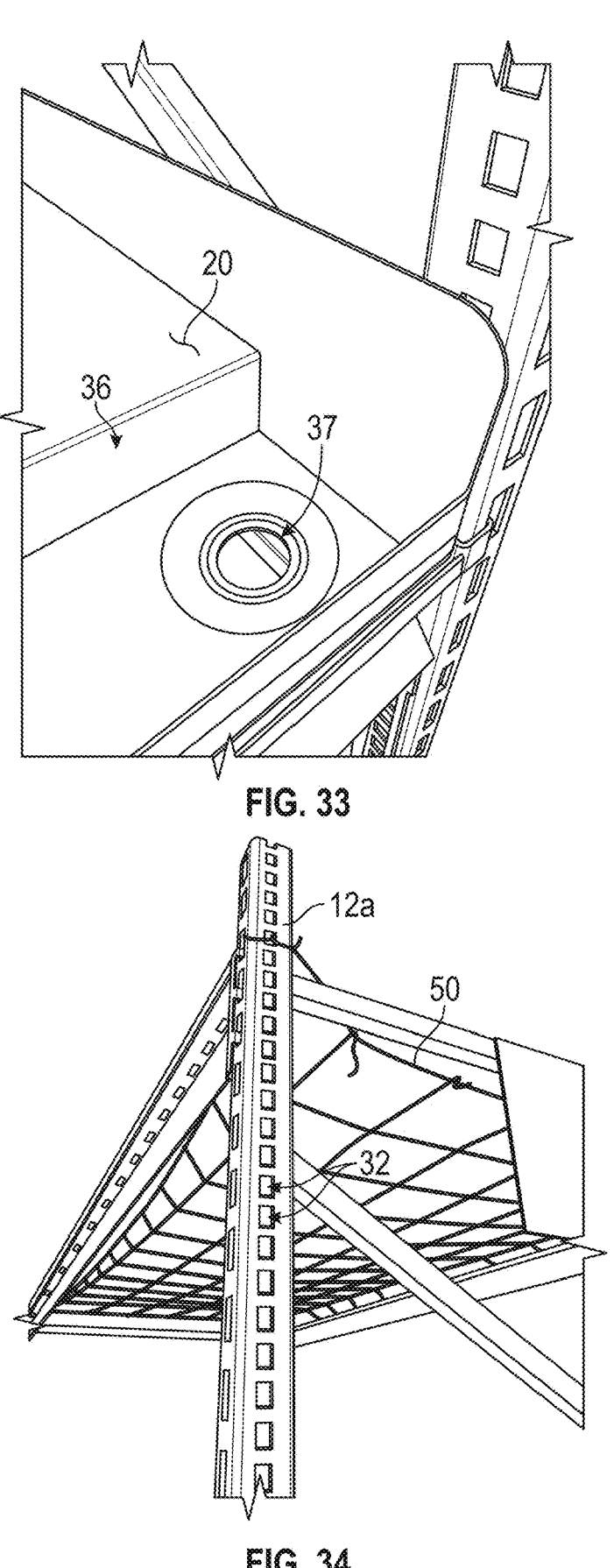
FIG. 33 is a perspective view of a corner region of another plant support tray, including integral water runoff trough and drain opening.
FIG. 34 is a perspective view of an upper region of the shelf system of FIG. 3, shown fitted with a netting.

In other embodiments, plant support trays 18 may include a separate tub portion 40 and insert portion 42 in the form of a wire mesh or perforated surface, such as shown in FIGS. 31 and 32. In another example, a metal formed pan or tray may have an integral trough 36 and drain 37, such as shown in FIG. 33.

Figure 26:
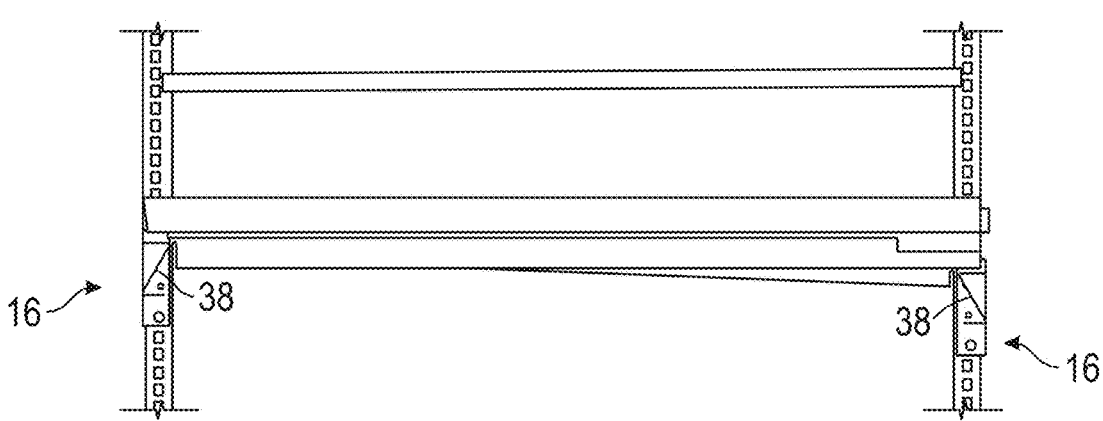
FIG. 26 is an end elevation of a portion of another shelf system, depicting a tray and trough support structure.
Figure 27:
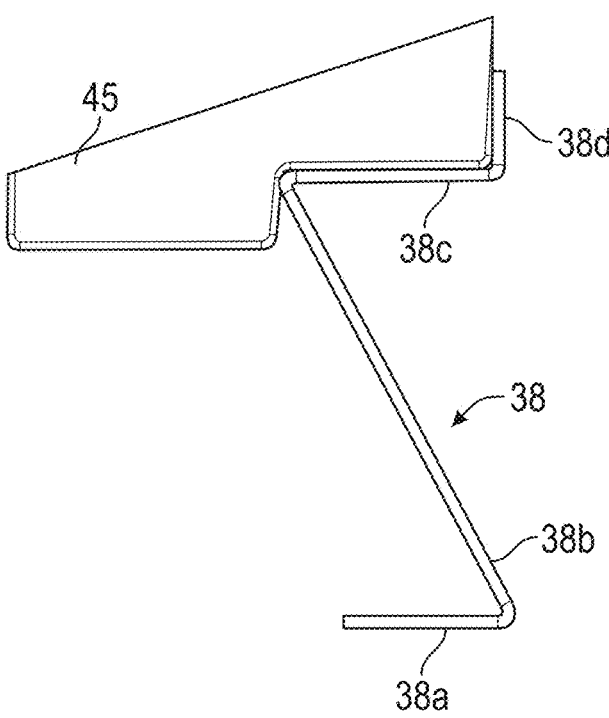
FIG. 27 is an enlarged end view of a tray and trough support structure of FIG. 26, shown supporting a water runoff trough.
Figure 28:
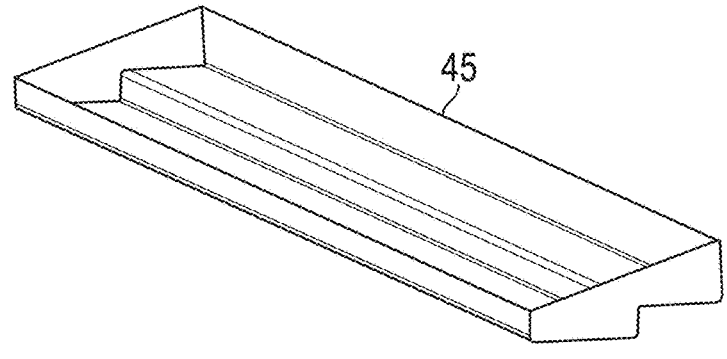
FIG. 28 is a top perspective view of the water runoff trough of FIG. 27.
Figure 29:
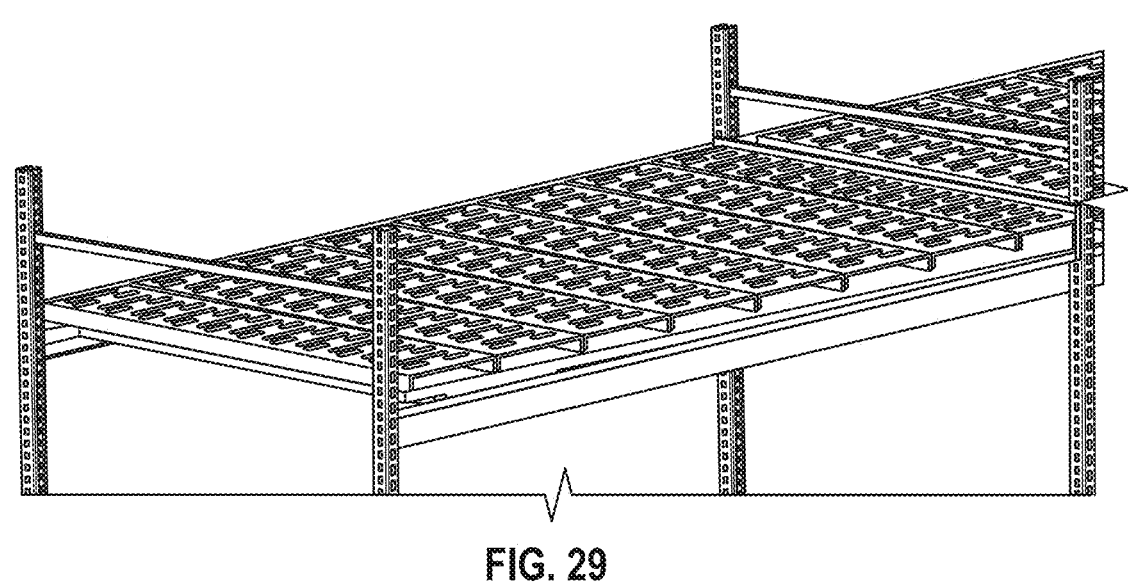
FIG. 29 is a top perspective view of an upper region of the shelf system of FIG. 1.

Optionally, and as shown in FIGS. 26 and 27, each of the vertically-spaced support racks 16 includes a pair of generally Z-shaped elongate rails 38, each including a generally horizontal bottom leg 38a, a diagonally-aligned upright leg 38b extending upwardly from one end of the bottom leg 38a, a generally horizontal upper leg 38c extending from an upper end of the diagonally-aligned upright leg 38b for supporting an end of one of the plant support trays or troughs, and a generally vertical upper leg 38d extending from an end of the generally horizontal upper leg 38c. Optionally, each of the generally Z-shaped elongate rails 38 includes a plurality of hooks 34 for engaging slots or openings 32 in one of the vertical posts 12a, such as shown in FIG. 30. Elongate rails 38 may be used to support cross-rails 19 or panels extending between vertical posts 12a, or to support trays or drainage troughs 45 such as shown in FIGS. 27 and 28.

Figure 35:
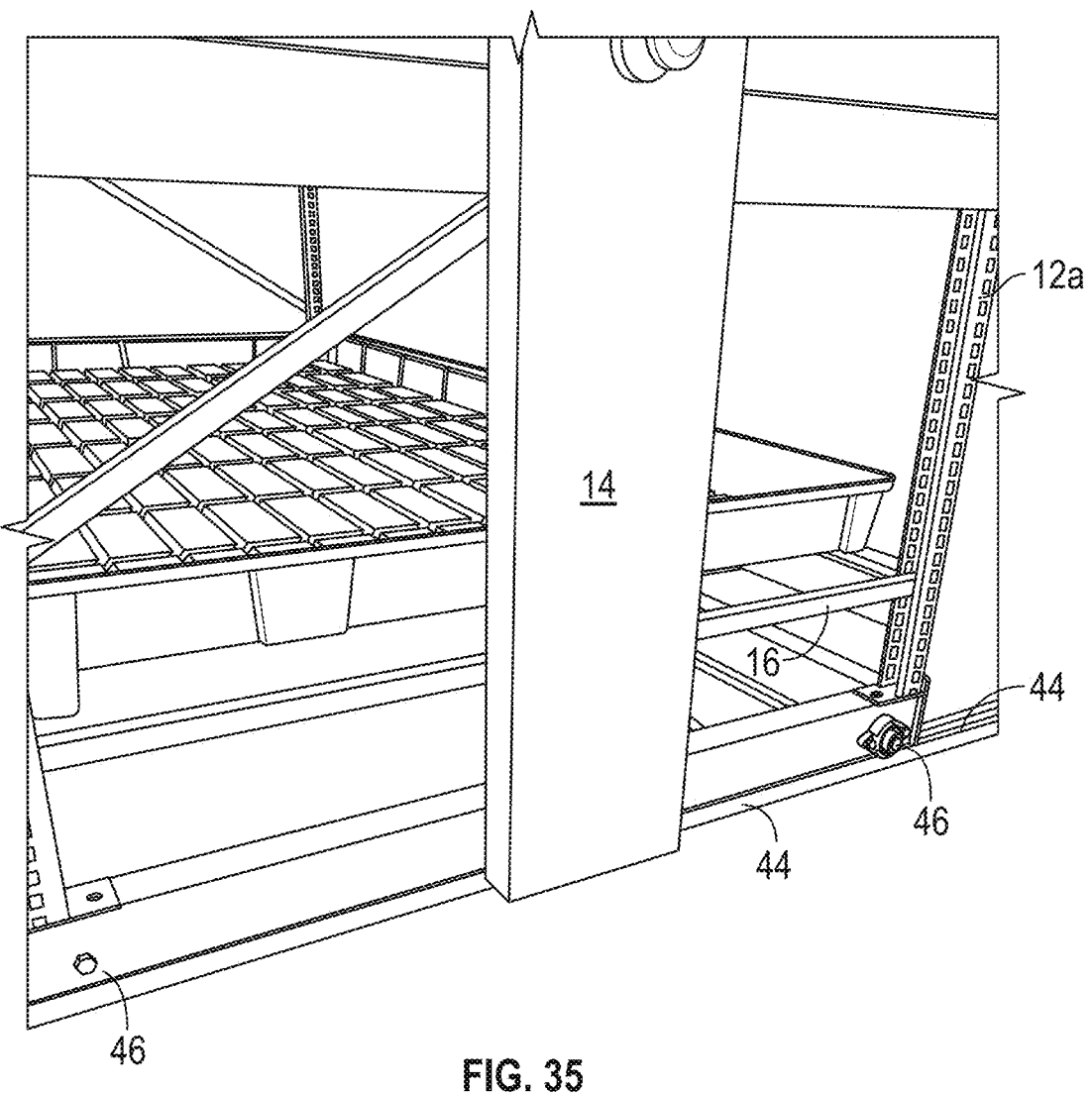
FIG. 35 is a perspective view of a lower region of the shelf system of FIG. 25, including a drive and support system thereof.

In order to provide enhanced horizontal space utilization in a growing environment, drive mechanism 14 allows adjacent shelving systems 10 to be placed in close or abutting side-by-side arrangements when the system 10 can be left to run in a fully or partially automated manner without need for access by caretakers. A pair of horizontally-spaced rails 44 are disposed along the substantially horizontal support surface F and a plurality of wheels 46 (FIG. 35) configured for rolling engagement along the rails 44. At least one of the wheels 46 is rotatably drivable by rotating a manual crank 48 or operating a powered drive system, for example. Such systems are readily available from Pipp Mobile Storage Systems, Inc. of Walker, Mich.

Thus, it will be appreciated that the plant shelving system provides for efficient space utilization and ease of use, including maintenance of the system and care of plants being grown on the system. Other optional features include overhead netting 50 (FIG. 34) and automated controls for lighting and pumps, plumbing for water supplies, water drainage, nutrient supplies, and the like.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A shelving system for plant cultivation, said shelving system comprising:

a frame including at least two upright frame portions;

a drive mechanism coupled to said frame and operable to move said frame in translation along a substantially horizontal support surface;

an upper support rack vertically-spaced above a lower support rack, each of said support racks extending between said upright frame portions;

a plant support tray positioned atop each of said support racks, said plant support trays each comprising a pot supporting surface and a plurality of grooves or channels extending below the pot supporting surface;

a forced-air ventilation system comprising a duct disposed below said upper support rack; and a lighting system comprising electric lamps supported below said upper support rack and below said duct;

wherein each of said support racks has a generally Z-shaped elongate rail comprising:

a generally horizontal bottom leg;

a diagonally-aligned upright leg extending upwardly from one end of said bottom leg;

a generally horizontal upper leg extending from an upper end of said diagonally-aligned upright leg for supporting an end of one of said plant support trays; and a generally vertical upper leg extending from an end of said generally horizontal upper leg.

2. The shelving system of claim 1, wherein each of said upright frame portions comprises a pair of vertical posts each with a plurality of vertically-spaced vertical post securing elements for engaging corresponding respective support rack securing elements of said support racks, wherein said support racks are vertically adjustable along said vertical posts via selective engagement of said support rack securing elements with said vertical post securing elements.

3. The shelving system of claim 1, wherein said plant support trays are configured so that said pot supporting surfaces are sloped relative to respective horizontal planes when tray-supporting surfaces of said support racks are parallel to the horizontal planes.

4. The shelving system of claim 1, wherein said plant support trays are configured so that said pot supporting surfaces are oriented along respective horizontal planes when respective tray-supporting surfaces of said support racks are parallel to the respective horizontal planes.

5. The shelving system of claim 4, wherein said plurality of grooves or channels define water-carrying surfaces that are positioned below the respective horizontal planes and are sloped relative to the respective horizontal planes when said plant support trays are supported at said support racks.

6. The shelving system of claim 1, wherein at least one of said plant support trays comprises a corrugated or undulating sheet material.

7. The shelving system of claim 6, further comprising a water runoff trough supported at one of said support racks at an end of said corrugated or undulating sheet material, wherein said water runoff trough is configured to receive a flow of water from said corrugated or undulating sheet material and to direct the flow of water to a drain formed in said water runoff trough.

8. The shelving system of claim 7, wherein said water runoff trough comprises a bottom wall and first and second upright walls extending upwardly from opposite edges of said bottom wall, wherein said first upright wall has a lower height than said second upright wall, wherein said first upright wall is configured to support an end of said corrugated or undulating sheet material and the height of said second upright wall exceeds the height of the end of said corrugated or undulating sheet material.

9. The shelving system of claim 1, wherein at least one of said plant support trays comprises an elongate trough at one end thereof, wherein said elongate trough is unitarily formed with said pot supporting surface and with surfaces defining said plurality of grooves or channels.

10. The shelving system of claim 1, wherein each of said support racks comprises a pair of said generally Z-shaped elongate rails.

11. The shelving system of claim 1, wherein said drive mechanism comprises a pair of horizontally-spaced rails disposed along the substantially horizontal support surface and a plurality of wheels configured for rolling engagement along said rails, wherein at least one of said wheels comprises a rotatably drivable wheel.

12. The shelving system of claim 8, further comprising a flange extending upwardly and rearwardly from said second upright wall of said water runoff trough, said flange extending directly above said end of said corrugated or undulating sheet material and at least a portion of said bottom wall.

13. A shelving system for plant cultivation, said shelving system comprising:

a frame including at least two upright frame portions;

a drive mechanism coupled to said frame and operable to move said frame in translation along a substantially horizontal support surface;

an upper support rack vertically-spaced above a lower support rack, each of said support racks extending between said upright frame portions;

a plant support tray positioned atop each of said support racks, said plant support trays each comprising:

a plant support surface; and a trough at a forward end portion of said plant support surface, said trough comprising:

a bottom panel defining an outlet;

a rear lip extending upwardly from said bottom panel for supporting said forward end portion of said plant support surface;

a forward lip extending upwardly from said bottom panel, said forward lip elevated above said rear lip and located forward of said forward end portion of said plant support surface;

a pair of sidewalls extending upwardly from said bottom panel and extending from said rear lip to said forward lip; and a flange extending upwardly and rearwardly from said forward lip, said flange extending directly above said forward end portion of said plant support surface and at least a portion of said bottom panel;

a forced-air ventilation system comprising a duct disposed below said upper support rack; and a lighting system comprising electric lamps supported below said upper support rack and below said duct.

14. The shelving system of claim 13, wherein each of said support racks comprises a pair of generally Z-shaped elongate rails, each of said generally Z-shaped elongate rails comprising a generally horizontal bottom leg, a diagonally-aligned upright leg extending upwardly from one end of said bottom leg, a generally horizontal upper leg extending from an upper end of said diagonally-aligned upright leg for supporting an end of one of said plant support surfaces, and a generally vertical upper leg extending from an end of said generally horizontal upper leg.

15. A shelving system for plant cultivation, said shelving system comprising:

a frame including at least two upright frame portions;

a drive mechanism coupled to said frame and operable to move said frame in translation along a substantially horizontal support surface;

an upper support rack vertically-spaced above a lower support rack, each of said support racks extending between said upright frame portions;

a plant support tray positioned atop each of said support racks, said plant support trays each comprising:

a plant support surface; and a trough at a forward end portion of said plant support surface, said trough comprising:

a bottom panel defining an outlet;

a rear lip extending upwardly from said bottom panel for supporting said forward end portion of said plant support surface;

a forward lip extending upwardly from said bottom panel, said forward lip elevated above said rear lip and located forward of said forward end portion of said plant support surface; and a pair of sidewalls extending upwardly from said bottom panel and extending from said rear lip to said forward lip;

a forced-air ventilation system comprising a duct disposed below said upper support rack; and a lighting system comprising electric lamps supported below said upper support rack and below said duct;

wherein each of said support racks has a generally Z-shaped elongate rail comprising:

a generally horizontal bottom leg;

a diagonally-aligned upright leg extending upwardly from one end of said bottom leg;

a generally horizontal upper leg extending from an upper end of said diagonally-aligned upright leg for supporting an end of one of said plant support surfaces; and a generally vertical upper leg extending from an end of said generally horizontal upper leg.

16. The shelving system of claim 15, further comprising a flange extending upwardly and rearwardly from said forward lip of said trough, said flange extending directly above said forward end portion of said plant support surface and at least a portion of said bottom panel.

17. The shelving system of claim 16, wherein at least one of said plant support trays comprises a corrugated or undulating sheet material.

18. The shelving system of claim 16, wherein each of said upright frame portions comprises a pair of vertical posts each with a plurality of vertically-spaced vertical post securing elements for engaging corresponding respective support rack securing elements of said support racks, wherein said support racks are vertically adjustable along said vertical posts via selective engagement of said support rack securing elements with said vertical post securing elements.

19. The shelving system of claim 16, wherein said plant support trays are configured so that said plant support surfaces are sloped relative to respective horizontal planes when tray-supporting surfaces of said support racks are parallel to the horizontal planes.

20. The shelving system of claim 16, wherein said plant support trays are configured so that said plant support surfaces are oriented along respective horizontal planes when respective tray-supporting surfaces of said support racks are parallel to the respective horizontal planes.

* * * * *